(12) United States Patent
Takahashi et al.

(10) Patent No.: US 9,407,786 B2
(45) Date of Patent: Aug. 2, 2016

(54) COOPERATIVE IMAGE PROCESSING SYSTEM, COOPERATIVE IMAGE PROCESSING METHOD, PORTABLE TERMINAL APPARATUS, IMAGE PROCESSING APPARATUS, AND RECORDING MEDIUM

(71) Applicant: KONICA MINOLTA, INC., Chiyoda-ku (JP)

(72) Inventors: Kazusei Takahashi, Nishinomiya (JP); Katsuhiko Akita, Amagasaki (JP); Takeshi Morikawa, Takarazuka (JP); Daisuke Nakano, Kobe (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/946,075

(22) Filed: Jul. 19, 2013

(65) Prior Publication Data
US 2014/0029049 A1 Jan. 30, 2014

(30) Foreign Application Priority Data
Jul. 30, 2012 (JP) ................................. 2012-169009

(51) Int. Cl.
| | | |
|---|---|---|
| *G06F 3/14* | (2006.01) | |
| *G06F 3/12* | (2006.01) | |
| *H04N 1/00* | (2006.01) | |
| *H04N 1/32* | (2006.01) | |
| *G06F 9/44* | (2006.01) | |

(52) U.S. Cl.
CPC .......... *H04N 1/00973* (2013.01); *G06F 3/1204* (2013.01); *G06F 3/1253* (2013.01);
(Continued)

(58) Field of Classification Search
CPC ....... G06F 9/4443; G06F 9/4445; G06F 3/12; G06F 3/048; G06F 3/04886; G06F 3/0481; G06F 3/1454; G06F 3/1258; G06F 3/1292; G06F 3/1205; G06F 3/1204; G06F 3/1253; G03G 15/5075; G03G 2215/00109; H04N 1/00973; H04N 2201/3278; H04N 2201/3212; H04N 1/00482; H04N 1/00912; H04N 1/00408; H04N 1/00307; H04N 2201/0094; H04N 2201/001; H04N 1/00474; H04N 1/32106; H04N 1/00225; H04M 1/72533

USPC .................. 358/1.11–1.18; 348/207.1; 710/8, 710/14–21; 715/740–744, 746, 751, 753, 715/761, 778, 864, 866
See application file for complete search history.

(56) References Cited

U.S. PATENT DOCUMENTS

| | | | | |
|---|---|---|---|---|
| 2006/0212629 | A1* | 9/2006 | Suzuki | .................. G06F 9/4411 710/104 |
| 2010/0302586 | A1* | 12/2010 | Takahashi | .......... G03G 15/5075 358/1.15 |

(Continued)

FOREIGN PATENT DOCUMENTS

| | | |
|---|---|---|
| JP | 2007-194786 A | 8/2007 |
| JP | 2008-146507 A | 6/2008 |

(Continued)

OTHER PUBLICATIONS

Office Action (Notification of Reasons for Refusal) issued on Nov. 12, 2014, by the Japanese Patent Office in corresponding Japanese Patent Application No. 2012-169009 and an English translation of the Office Action. (7 pages).

*Primary Examiner* — Chad Dickerson
(74) *Attorney, Agent, or Firm* — Buchanan Ingersoll & Rooney PC

(57) ABSTRACT

A cooperative system comprises an image processing apparatus and a portable terminal; the image processing apparatus comprises: a display; an obtaining portion obtaining screen data from the portable terminal; a display controller displaying a first and second screen on the display; and a transmitter transmitting screen data and operation information to the portable terminal; the portable terminal comprises: a display; an obtaining portion obtaining screen data from the image processing apparatus; a display controller displaying the first and second screen on the display; a transmitter transmitting screen data and operation information to the image processing apparatus; a memory storing a cooperation table; an identification portion that, when user operates the first screen on the display of the portable terminal or image processor, identifies a potential next operation as corresponding to the user's operation; and a notification transmitter transmitting a notification of the potential next operation to the image processing apparatus.

16 Claims, 14 Drawing Sheets

(52) U.S. Cl.
CPC .......... *G06F3/1292* (2013.01); *H04N 1/00307* (2013.01); *H04N 1/00408* (2013.01); *H04N 1/00474* (2013.01); *H04N 1/00482* (2013.01); *H04N 1/00912* (2013.01); *H04N 1/32106* (2013.01); *G06F 3/1205* (2013.01); *G06F 3/1258* (2013.01); *G06F 9/4443* (2013.01); *H04N 1/00225* (2013.01); *H04N 2201/001* (2013.01); *H04N 2201/0094* (2013.01); *H04N 2201/3212* (2013.01); *H04N 2201/3278* (2013.01)

(56) References Cited

U.S. PATENT DOCUMENTS

| | | | | |
|---|---|---|---|---|
| 2011/0246904 | A1* | 10/2011 | Pinto | G06F 9/4445 715/740 |
| 2012/0092715 | A1* | 4/2012 | Kamei | G06F 3/04886 358/1.15 |
| 2012/0182432 | A1* | 7/2012 | Okamoto | G06F 3/1204 348/207.1 |
| 2012/0327443 | A1* | 12/2012 | Fujii | H04N 1/00222 358/1.13 |

FOREIGN PATENT DOCUMENTS

| | | | |
|---|---|---|---|
| JP | 2008-219351 A | | 9/2008 |
| JP | 2008219351 A | * | 9/2008 |
| JP | 2010-187205 A | | 8/2010 |
| JP | 2012-085140 A | | 4/2012 |

* cited by examiner

Message shown by cooperation software

New application software has been installed.
Before using the new application software, you need to update your cooperation software.
By accessing server or MFP, you can check if there is a new cooperation table and can update your cooperation software.

Please select any of the following options:
(By default you will update by accessing server)

[X] Update by accessing server

[ ] Update by accessing MFP

[ ] Do not update (access neither of them)

FIG.14

COOPERATIVE IMAGE PROCESSING SYSTEM, COOPERATIVE IMAGE PROCESSING METHOD, PORTABLE TERMINAL APPARATUS, IMAGE PROCESSING APPARATUS, AND RECORDING MEDIUM

This application claims priority under 35 U.S.C. §119 to Japanese Patent Application No. 2012-169009 filed on Jul. 30, 2012, the entire disclosure of which is incorporated herein by reference in its entirety.

BACKGROUND OF THE INVENTION

1. Field of the Invention

The present invention relates to a cooperative image processing system that includes: an image processing apparatus such as a multi-function peripheral (MFP), i.e., a multifunctional digital machine; a portable terminal apparatus such as a smartphone or a tablet computer terminal that is capable of connecting to the image processing apparatus; a cooperative image processing method for the cooperative image processing system; the portable terminal apparatus; the image processing apparatus; and a recording medium.

2. Description of the Related Art

The following description sets forth the inventor's knowledge of related art and problems therein and should not be construed as an admission of knowledge in the prior art.

In recent years, users can store digital documents on their portable information apparatuses such as smartphones and tablet computer terminals, and even view and edit the stored documents anytime and anywhere they like. After editing a document by the portable terminal apparatus, users can transmit the document to an image processing apparatus such as a MFP to have it printed out by or stored on the image processing apparatus. Users also can create a file consisting of image data, for example, by scanning a physical paper document with a scanner of the image processing apparatus, and transmit it to their portable information apparatuses to edit the file thereby.

However, users are bothered by operating different screens from the image processing apparatus and the portable information apparatus, back and forth separately, which is quite troublesome.

In recent years, there has been a cooperative image processing system with an image processing apparatus and a portable terminal apparatus, which allows a user to access functions of both the image processing apparatus and the portable terminal apparatus from either of them, by displaying an operation screen of the image processing apparatus to operate the image processing apparatus and an operation screen of the portable terminal apparatus to operate the portable terminal apparatus, together side by side on a display portion of the image processing apparatus or the portable terminal apparatus. In this cooperative image processing system, the image processing apparatus and the portable terminal apparatus are allowed to exchange display data with each other and display the operation screens of both the image processing apparatus and the portable terminal apparatus based on the display data from each other, exactly the same on their display portions.

With this cooperative image processing apparatus, a user can instruct the image processing apparatus and the portable terminal apparatus to perform processing cooperatively on a document file, by operating different operation screens that the user needs to reach as follows, for example:

[1] In order to give instructions to the portable terminal apparatus, user goes to the third and lower level from the top screen to reach the operation screen of the portable terminal apparatus, with a parameter field, option buttons, and the like being thereon.

[2] In order to give instructions to the image processing apparatus, user goes to the fifth and lower level from the top screen to reach the operation screen of the image processing apparatus, with a parameter field, option buttons, and the like being thereon.

In this case, the user moves to the third and lower level and the fifth and lower level from the top screen to reach the operation screens of the portable terminal apparatus and the image processing apparatus, respectively, which is a somewhat troublesome operation. That is, the user has to switch back and forth between the different operation screens on the display portion, which is considered as the evidence of an unfriendly user interface.

There is a first method to solve this problem, in which: the user registers in advance his/her familiar operations onto the portable terminal apparatus and the image processing apparatus to prepare a menu with short-cut buttons for the familiar operations, and calls out the menu onto the different operation screens to start the cooperation between the portable terminal apparatus and the image processing apparatus. Thus the user can select a preferred short-cut button from the menu to reach a target operation screen.

There is also a second method to solve this problem, in which after having finished operations to some extent on the operation screen of the portable terminal apparatus, the user connects the portable terminal apparatus and the image processing apparatus to each other to start the cooperation between them. In this method, the image processing apparatus detects the progress of the user's operations on the portable terminal apparatus and displays a target operation screen on the basis of the progress.

Japanese Unexamined Patent Publication No. 2008-219351 teaches an image forming system comprising an image forming apparatus and a portable terminal apparatus, the image forming apparatus being configured to: transmit screen information for remote operation to the portable terminal apparatus in response to a request therefrom; and perform processing in accordance with instructions also therefrom, the portable terminal apparatus being configured to: display an operation screen by converting an image included in the screen information by a value set in advance; and transmit instructions entered through the operation screen, to the image forming apparatus.

However, in the first method as previously mentioned, the user possibly may be bothered by registering in advance his/her familiar operations as short-cut buttons because other users' familiar operations are not always familiar to him/her as well, which is an unsolved problem. Furthermore, the user could not take much advantage from the cooperation between the portable terminal apparatus and the image processing apparatus because he/she is still bothered by calling out short-cut buttons onto the different operation screens so as to select among them, which is another unsolved problem.

In the second method as previously mentioned, there could be a trouble when the user has to work on a complex task by the cooperation. For example, the user would be bothered by switching back and forth between the different operation screens; the user would be much more bothered by doing this when trying to access multiple functions at a time by the cooperation, which is yet another unsolved problem.

Unfortunately, the invention described in Japanese Unexamined Patent Publication No. 2008-219351 does not provide any perfect solution to the problems mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a cooperative image processing system comprising an image processing apparatus and a portable terminal apparatus capable of connecting to each other, the image processing apparatus comprising:
a display portion;
a screen data obtaining portion that obtains screen data for reproducing a first operation screen that allows operating the portable terminal apparatus, from the portable terminal apparatus;
a display controller that displays a second operation screen that allows operating the image processing apparatus and the first operation screen based on the screen data obtained by the screen data obtaining portion, together on the display portion; and
a transmitter that transmits to the portable terminal apparatus: screen data for reproducing a next second operation screen when the next second operation screen needs to be displayed on the display portion instead of the second operation screen; and operation information when user operates the first operation screen on the display portion, the portable terminal apparatus comprising:
a display portion;
a screen data obtaining portion that obtains screen data for reproducing the second operation screen, from the image processing apparatus;
a display controller that displays the first operation screen and the second operation screen based on the screen data obtained by the screen data obtaining portion of the portable terminal apparatus, together on the display portion of the portable terminal apparatus;
a transmitter that transmits to the image processing apparatus: screen data for reproducing a next first operation screen when the next first operation screen needs to be displayed on the display portion of the portable terminal apparatus instead of the first operation screen; and operation information when user operates the second operation screen thereon;
a memory that stores a cooperation table that contains the detail of operations on the first operation screen and potential next operations most likely expected to follow the operations;
an operation identification portion that, when user operates the first operation screen on the display portion of the portable terminal apparatus or the image processing apparatus, identifies a potential next operation as corresponding to the user's operation among those in the cooperation table; and
a notification transmitter that transmits a notification of the potential next operation identified by the operation identification portion,
wherein the image processing apparatus further comprises a switch portion that switches the second operation screen on the display portion of the image processing apparatus, to a suitable operation screen for the potential next operation when the image processing apparatus receives the notification from the portable terminal apparatus.

A second aspect of the present invention relates to a cooperative image processing system comprising an image processing apparatus and a portable terminal apparatus capable of connecting to each other, the image processing apparatus comprising:
a display portion;
a screen data obtaining portion that obtains screen data for reproducing a first operation screen that allows operating the portable terminal apparatus, from the portable terminal apparatus;
a display controller that displays a second operation screen that allows operating the image processing apparatus and the first operation screen based on the screen data obtained by the screen data obtaining portion, together on the display portion;
a transmitter that transmits to the portable terminal apparatus: screen data for reproducing a next second operation screen when the next second operation screen needs to be displayed on the display portion instead of the second operation screen; and operation information when user operates the first operation screen on the display portion; and
a memory that stores a cooperation table that contains the detail of operations on the first operation screen and potential next operations most likely expected to follow the operations, the portable terminal apparatus comprising:
a display portion;
a screen data obtaining portion that obtains screen data for reproducing the second operation screen, from the image processing apparatus;
a display controller that displays a first operation screen that allows operating the portable terminal apparatus and the second operation screen based on the screen data obtained from the image processing apparatus, together on the display portion;
a transmitter that transmits to the image processing apparatus: screen data for reproducing a next first operation screen when the next first operation screen needs to be displayed on the display portion of the portable terminal apparatus instead of the first operation screen; and operation information when user operates the second operation screen thereon; and
a notification transmitter that, when user operates the first operation screen on the display portion of the portable terminal apparatus or the image processing apparatus, transmits a notification of the user's operation to the image processing apparatus, wherein the image processing apparatus further comprises:
an operation identification portion that, when the image processing apparatus receives the notification from the portable terminal apparatus, identifies a potential next operation as corresponding to the user's operation among those in the cooperation table; and
a switch portion that switches the second operation screen on the display portion of the image processing apparatus, to a suitable operation screen for the potential next operation identified by the operation identification portion.

A third aspect of the present invention relates to a cooperative image processing method to be implemented by a cooperative image processing system comprising an image processing apparatus and a portable terminal apparatus capable of connecting to each other, the cooperative image processing method comprising:

the following steps of the image processing apparatus:
obtaining screen data for reproducing a first operation screen that allows operating the portable terminal apparatus, from the portable terminal apparatus;
displaying a second operation screen that allows operating the image processing apparatus and the first operation screen based on the screen data obtained from the portable terminal apparatus, together on a display portion; and
transmitting to the portable terminal apparatus: screen data for reproducing a next second operation screen when the next second operation screen needs to be displayed on the display portion instead of the second operation screen; and operation information when user operates the first operation screen on the display portion; and the following steps of the portable terminal apparatus:
obtaining screen data for reproducing the second operation screen from the image processing apparatus;
displaying the first operation screen and the second operation screen based on the screen data obtained from the image processing apparatus, together on a display portion;
transmitting to the image processing apparatus: screen data for reproducing a next first operation screen when the next first operation screen needs to be displayed on the display portion of the portable terminal apparatus instead of the first operation screen; and operation information indicating when user operates the second operation screen thereon; and
storing on a memory, a cooperation table that contains the detail of operations on the first operation screen and potential next operations most likely expected to follow the operations;
when user operates the first operation screen on the display portion of the portable terminal apparatus or the image processing apparatus, identifying a potential next operation as corresponding to the user's operation among those in the cooperation table; and
transmitting a notification of the identified potential next operation to the image processing apparatus,
wherein the cooperative image processing method further comprises the following step of the image processing apparatus: switching the second operation screen on the display portion of the image processing apparatus to a suitable operation screen for the potential next operation, when the image processing apparatus receives a notification of the potential next operation.

A fourth aspect of the present invention relates to a cooperative image processing method to be implemented by a cooperative image processing system comprising an image processing apparatus and a portable terminal apparatus capable of connecting to each other, the cooperative image processing method comprising:

the following steps of the image processing apparatus:
obtaining screen data for reproducing a first operation screen that allows operating the portable terminal apparatus, from the portable terminal apparatus;
displaying a second operation screen that allows operating the image processing apparatus and the first operation screen based on the screen data obtained from the portable terminal apparatus, together on a display portion;
transmitting to the portable terminal apparatus: screen data for reproducing a next second operation screen when the next second operation screen needs to be displayed on the display portion instead of the second operation screen; and operation information when user operates the first operation screen on the display portion; and
storing on a memory, a cooperation table that contains the detail of operations on the first operation screen and potential next operations most likely expected to follow the operations; and the following steps of the portable terminal apparatus:
obtaining screen data for reproducing the second operation screen from the image processing apparatus;
displaying the first operation screen and the second operation screen based on the screen data obtained from the image processing apparatus, together on a display portion;
transmitting to the image processing apparatus: screen data for reproducing a next first operation screen when the next first operation screen needs to be displayed on the display portion of the portable terminal apparatus instead of the first operation screen; and operation information when user operates the second operation screen thereon; and
when user operates the first operation screen on the display portion of the portable terminal apparatus or the image processing apparatus, transmitting a notification of the user's operation to the image processing apparatus,
wherein the cooperative image processing method further comprises the following step of the image processing apparatus:
when the image processing apparatus receives the notification of the user's operation from the portable terminal apparatus, identifying a potential next operation as corresponding to the user's operation among those in the cooperation table; and
switching the second operation screen on the display portion of the image processing apparatus, to a suitable operation screen for the identified potential next operation.

A fifth aspect of the present invention relates to a portable terminal apparatus comprising:
a connector that connects to an image processing apparatus;
a display portion;
a screen data obtaining portion that obtains screen data for reproducing a second operation screen that allows operating the image processing apparatus, from the image processing apparatus;
a display controller that displays a first operation screen that allows operating the portable terminal apparatus and the second operation screen based on the screen data obtained from the image processing apparatus, together on the display portion;
a transmitter that transmits to the image processing apparatus: screen data for reproducing a next first operation screen when the next first operation screen needs to be displayed on the display portion instead of the first operation screen; and operation information when user operates the second operation screen thereon;
a memory that stores a cooperation table that contains the detail of operations on the first operation screen and potential next operations most likely expected to follow the operations;
an operation identification portion that, when user operates the first operation screen on the display portion of the portable terminal apparatus or the image processing apparatus, identifies a potential next operation as corresponding to the user's operation among those in the cooperation table; and a notification transmitter that transmits a notification of the potential next operation identified by the operation identification portion.

A sixth aspect of the present invention relates to an image processing apparatus comprising:
- a connector that connects to a portable terminal apparatus;
- a display portion;
- a screen data obtaining portion that obtains screen data for reproducing a first operation screen that allows operating the portable terminal apparatus, from the portable terminal apparatus;
- a display controller that displays a second operation screen that allows operating the image processing apparatus and the first operation screen based on the screen data obtained by the screen data obtaining portion, together on the display portion;
- a transmitter that transmits to the portable terminal apparatus, operation information when user operates the first operation screen on the display portion; and
- a switch portion that switches the second operation screen on the display portion to a suitable operation screen for a potential next operation to be received from the portable terminal apparatus, when user operates the first operation screen on the display portion of the image processing apparatus or on a display portion of the portable terminal apparatus.

A seventh aspect of the present invention relates to an image processing apparatus comprising:
- a connector that connects to a portable terminal apparatus;
- a display portion;
- a screen data obtaining portion that obtains screen data for reproducing a first operation screen that allows operating the portable terminal apparatus, from the portable terminal apparatus;
- a display controller that displays a second operation screen that allows operating the image processing apparatus and the first operation screen based on the screen data obtained by the screen data obtaining portion, together on the display portion;
- a transmitter that transmits to the portable terminal apparatus, operation information when user operates the first operation screen on the display portion;
- a memory that stores a cooperation table that contains the detail of operations on the first operation screen and potential next operations most likely expected to follow the operations;
- an operation identification portion that identifies a potential next operation to be received from the portable terminal apparatus, among those in the cooperation table, when user operates the first operation screen on the display portion of the image processing apparatus or on a display portion of the portable terminal apparatus; and
- a switch portion that switches the second operation screen on the display portion to a suitable operation screen for the potential next operation identified by the operation identification portion.

A eighth aspect of the present invention relates to a non-transitory computer-readable recording medium with a cooperation program being stored thereon to make a computer of an image processing apparatus execute:
- connecting to a portable terminal apparatus;
- obtaining screen data for reproducing a first operation screen that allows operating the portable terminal apparatus, from the portable terminal apparatus;
- displaying a second operation screen that allows operating the image processing apparatus and the first operation screen based on the screen data obtained from the portable terminal apparatus, together on a display portion;
- transmitting to the portable terminal apparatus, operation information when user operates the first operation screen on the display portion; and
- switching the second operation screen on the display portion to a suitable operation screen for a potential next operation to be received from the portable terminal apparatus, when user operates the first operation screen on the display portion of the image processing apparatus or on a display portion of the portable terminal apparatus.

A ninth aspect of the present invention relates to a non-transitory computer-readable recording medium with a cooperation program being stored thereon to make a computer of an image processing apparatus execute:
- connecting to a portable terminal apparatus;
- obtaining screen data for reproducing a first operation screen that allows operating the portable terminal apparatus, from the portable terminal apparatus;
- displaying a second operation screen that allows operating the image processing apparatus and the first operation screen based on the screen data obtained from the portable terminal apparatus, together on a display portion;
- transmitting to the portable terminal apparatus, operation information when user operates the first operation screen on the display portion;
- storing on a memory, a cooperation table that contains the detail of operations on the first operation screen and potential next operations expected to follow the operations;
- identifying a potential next operation to be received from the portable terminal apparatus, among those in the cooperation table, when user operates the first operation screen on the display portion of the image processing apparatus or on a display portion of the portable terminal apparatus; and
- switching the second operation screen on the display portion of the image processing apparatus, to a suitable operation screen for the identified potential next operation.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 14 illustrates a confirmation screen to confirm with the user whether or not it is necessary to update the cooperation table.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
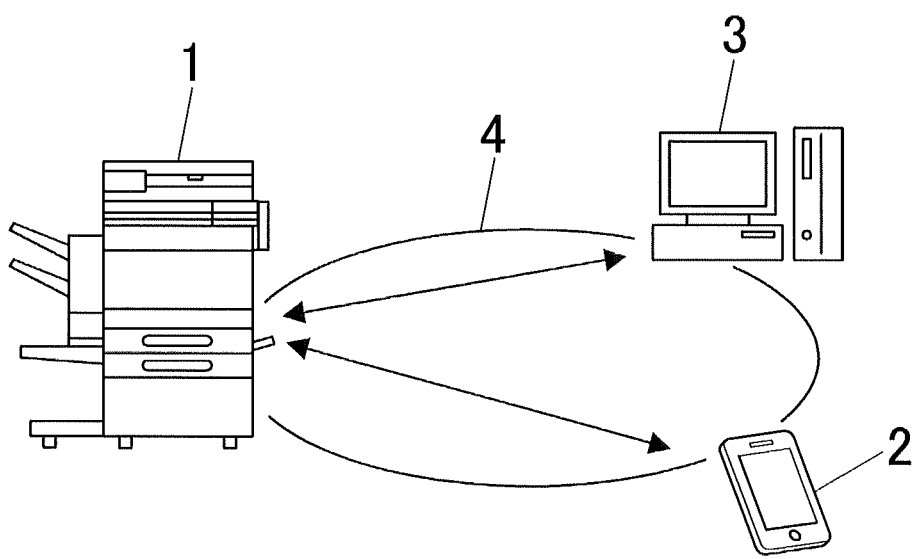
FIG. 1 is a view illustrating a configuration of a cooperative image processing system according to one embodiment of the present invention.

FIG. 1 illustrates a configuration of a cooperative image processing system according to one embodiment of the present invention.

The cooperative image processing system is provided with: an image processing apparatus 1; a portable terminal apparatus 2 such as a smartphone or a tablet computer terminal; and a user terminal 3 such as a personal computer; the image processing apparatus 1, the portable terminal apparatus 2, and the user terminal 3 are capable of connecting to each other via a network such as a LAN.

In this embodiment, a MFP having various functions such as a copier, printer, scanner, and facsimile function, as described above, is employed as the image processing apparatus 1. Hereinafter, the image processing apparatus 1 will also be referred to as MFP 1. The portable terminal apparatus 2 will also be referred to as portable terminal 2.

Figure 2:
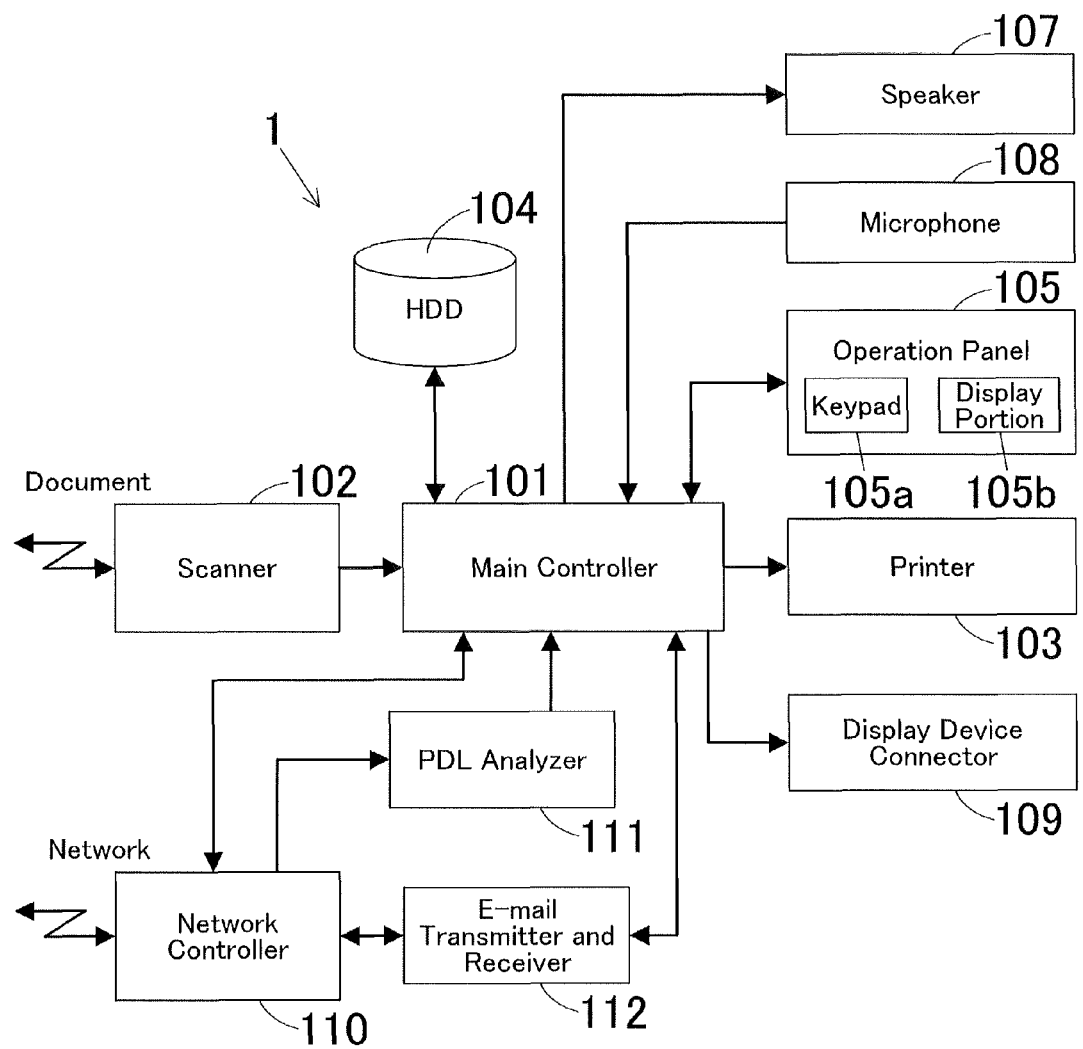
FIG. 2 is a block diagram illustrating a hardware configuration of an image processing apparatus.

FIG. 2 is a block diagram illustrating a hardware configuration of the entire MFP 1.

The MFP 1 is provided with: a main controller 101; a scanner 102; a printer 103; a memory 104, an operation panel 105; a speaker 107; a microphone 108; a display device connector 109; a network controller 110; a page description language (PDL) analyzer 111; an e-mail transmitter and receiver 112; and the like.

The main controller 101 is provided with: a CPU not shown in the figure; a ROM that is a memory storing operation programs for the CPU and the like; a RAM that is a memory providing a work area for the CPU to perform processing in accordance with an operation program or application software; and the like. The main controller 101 controls the entire MFP 1 in a unified and systematic manner by executing an operation program or application software. For example, specifically, the main controller 101 controls an entire sequence of various operations such as scanning, printing, data transmission, and data receipt based on the functions of the MFP 1. In this embodiment, the main controller 101 further facilitates the cooperation with the portable terminal 2 to allow access to the functions of the MFP 1.

More specifically, the main controller 101 obtains from the portable terminal 2, screen data for reproducing an operation screen of the portable terminal 2, and display the operation screen of the MFP 1 and the portable terminal 2 together on the operation panel 105. Furthermore, when a user operates the operation screen of the portable terminal 2 on the operation panel 105, the main controller 101 transmits a notification that the user has just operated the operation screen, to the portable terminal 2. When a next operation screen of the MFP 1 appears on the operation panel 105, the main controller 101 transmits screen data for reproducing the next operation screen to the portable terminal 2; when the user operates the operation screen of the MFP 1 from the operation panel 105 or the portable terminal 2, the main controller 101 performs a suitable operation for the user's operation.

Furthermore, in this embodiment, when a user operates the operation screen of the MFP 1 from the operation panel 105 or the portable terminal 2, the main controller 101 receives a potential next operation that corresponds to the user's operation from the portable terminal 2. Then the main controller 101 switches the operation screen of the MFP 1 to a suitable operation screen for the potential next operation. This will be later described in detail.

The scanner 102 reads out images from a document put on a platen glass or an automatic document feeder not shown in the figure and outputs image data that is electronic data to the main controller 101.

The printer 103 prints on sheets of paper, image data read out from a document by the scanner 102 and print data received from the portable terminal 2 and the user terminal 3.

The memory 104 stores: document data managed by the main controller 101; control data for the main controller 101 to control the entire MFP 1; various types of data such as information of the portable terminal 2; application software; and the like. The memory 104 is constituted by a hard disk device (HDD). Specifically, in this embodiment, the memory 104 stores a cooperation table that contains the detail of operations on the operation screen of the portable terminal 2 and potential next operations most likely expected to follow the operations, in addition to screen data for reproducing an operation screen of the MFP 1 on the operation panel 105 and screen data for reproducing a suitable operation screen for a potential next operation received from the portable terminal 2, which corresponds to the user's operation.

In other words, the potential next operations represent those that the user most likely wants to perform on the MFP 1 when operating the operation screen of the portable terminal 2. The potential next operations are specified in advance for the operations on the operation screen of the portable terminal 2.

The operation panel 105 displays messages and other information for users to operate the MFP 1. The operation panel 105 is provided with: a keypad 105a having a Start key, numeric and other keys; and a display portion 105b that is constituted by a liquid-crystal display, for example, with touch-panel functionality. Settings entered from the operation panel 105 are transferred to the main controller 101 and the like.

The speaker 107 is a device that delivers voice data to users; the microphone 108 is a device that receives voice data from users to transfer to the main controller 101. The display device connector 109 connects to a display device such as a projector or a display portion.

The network controller 110, which is connected to the portable terminal 2, the user terminal 2, and the like, exchanges packet data with them on a network such as a LAN, transfers the packet data to the PDL analyzer 111 and the e-mail transmitter and receiver 112, and performs communication with a cloud server and a shared server.

The PDL analyzer 111 converts print data received from the user terminal 3 and the like via the network controller 110, into image data to transfer to the main controller 101. The e-mail transmitter and receiver 112 converts documents received by electronic mail via the network 4, into image data to transfer to the main controller 110.

Figure 3:
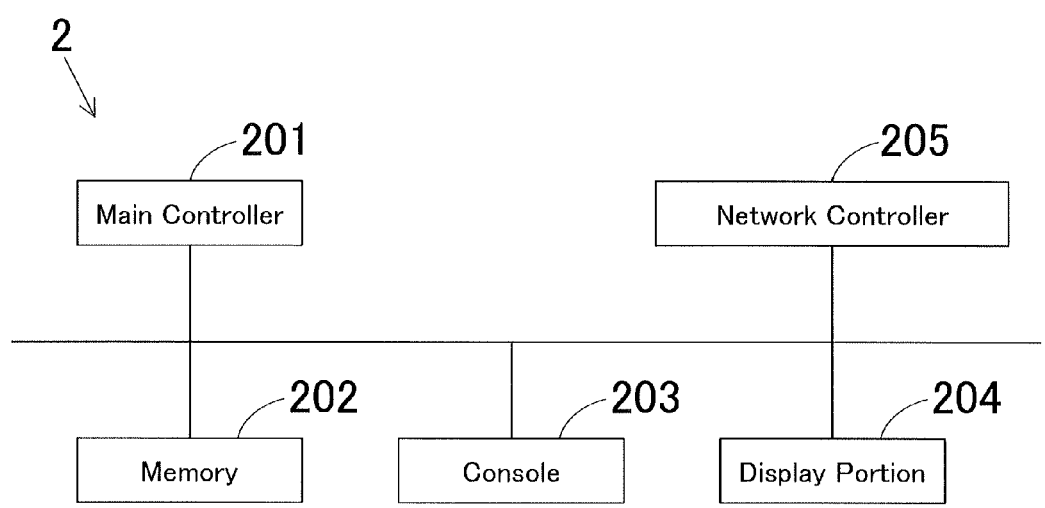
FIG. 3 is a block diagram illustrating a hardware configuration of a portable terminal apparatus.

FIG. 3 is a block diagram illustrating a hardware configuration of the portable terminal 2.

The portable terminal 2 is provided with: a main controller 201; a memory 202; a console 203; a display portion 204; a network controller 205; and the like.

The main controller 201 is provided with: a CPU not shown in the figure; a RAM that is a memory providing a work area for the CPU to perform processing in accordance with an operation program or application software; and the like. The main controller 201 controls the entire portable terminal 2 in a unified and systematic manner by executing an operation program or application software. Specifically, the main controller 201, for example, creates and edits documents in accordance with certain application software, stores documents on a cloud server, receives image data obtained by the scanner 102 of the MFP 1 from a document to perform processing thereon. In this embodiment, the main controller 201 further facilitates the cooperation with the MFP 1 to access the functions of the MFP 1.

More specifically, the main controller 201 obtains from the MFP 1, screen data for reproducing an operation screen of the MFP 1, and displays the operation screens of the MFP 1 and the portable terminal 2 together on the display portion 204. Furthermore, when a user operates the operation screen of the MFP 1 on the display portion 204, the main controller 101 transmits operation information indicating the content of the user's operation, to the MFP 1. When a next operation screen of the portable terminal 2 appears on the display portion 204, the main controller 201 transmits screen data for reproducing the next operation screen to the MFP 1; when the user operates the operation screen of the portable terminal 2 on the display portion 204 or the MFP 1, the main controller 201 performs a suitable operation for the user's operation.

Furthermore, in this embodiment, when a user operates the operation screen of the portable terminal 2 from the display portion 204 or the MFP 1, the main controller 201 identifies a potential next operation that corresponds to the user's operation and transmits a notification of the potential next operation to the MFP 1. This will be later described in detail.

The memory 202 stores: control data for the main controller 201 to control the entire portable terminal 2; various types of data such as information of the MFP 1; application software; and the like. The memory 202 is constituted by a hard disk device (HDD). Specifically, in this embodiment, the memory 202 stores a cooperation table that contains the detail of operations on the operation screen of the portable terminal 2 and potential next operations most likely expected to follow the operations.

The console 203 allows users to operate the portable terminal 2 and the MFP 1. The console 203 is mainly constituted by a touch-panel display. The display portion 204, which is constituted by a liquid-crystal display device, for example, displays an operation screen of the portable terminal 2. In this embodiment, the display portion 204 displays the operation screens of the MFP 1 and the portable terminal 2 together while the cooperation with the MFP 1 is active.

The network controller 205, which is connected to the MFP 1, the user terminal 3, and the like, exchanges packet data with them on a network such as a LAN.

Hereinafter, how the MFP 1 facilitates the cooperation with the portable terminal 2 to allow access to the functions of the MFP 1.

Figure 4:
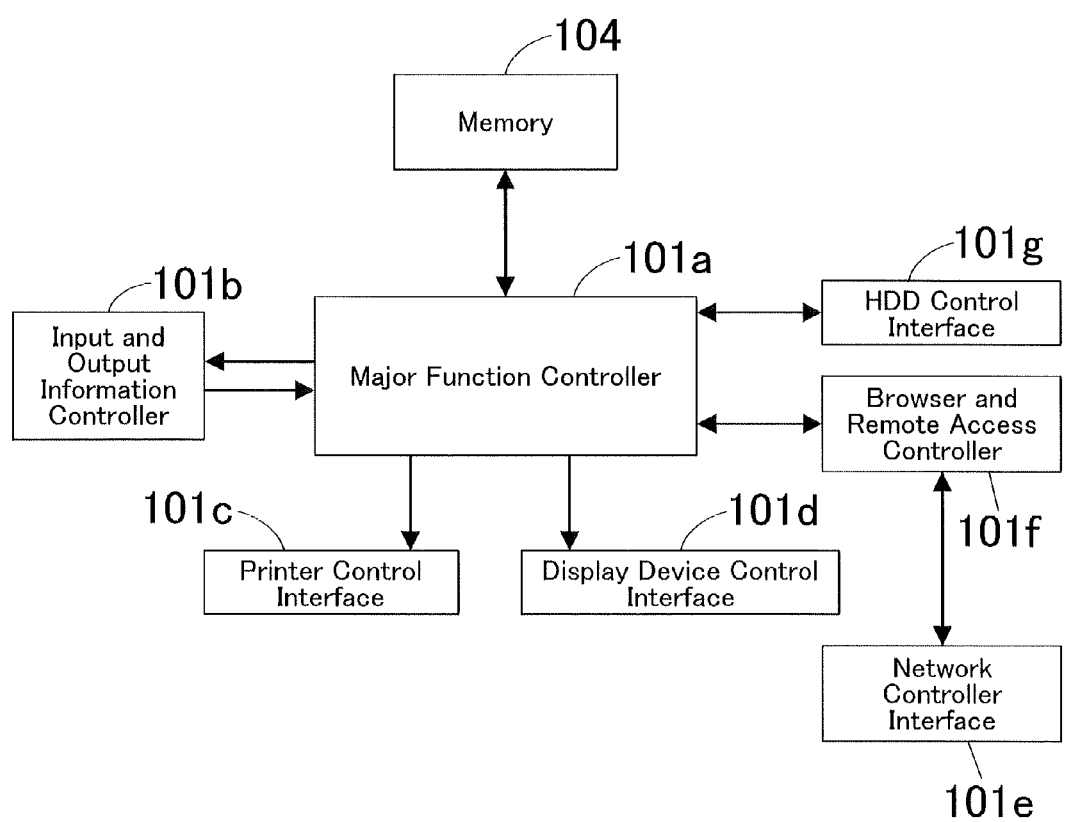
FIG. 4 is a block diagram illustrating how a main controller of the image processing apparatus controls the cooperation with the portable terminal apparatus.

FIG. 4 is a functional block diagram illustrating how the main controller 101 of the MFP 1 controls the cooperation with the portable terminal 2. The functional block diagram is composed of: a major function controller 101a that is responsible for operation information, job generation, and document update; an input and output information controller 101b; a printer control interface 101c; a display device control interface 101d; a network controller interface 101e; a browser and remote access controller 101f; and a HDD control interface 101g.

Documents can be stored on the memory 104 that is connected to the main controller 101 through the HDD control interface 101g and read out from the memory 104 also through the HDD control interface 101g. They also can be transferred to the portable terminal 2 through the network controller interface 101e.

The following objects: data; screen information (screen data for reproducing operation screens); operation information indicating the detail of operations; result information indicating the result of the operations; and the like, can be exchanged with the portable terminal 2 through the network controller interface 101e. The MFP 1 and the portable terminal 2 do not always necessarily perform communication through the network controller interface 101e; instead, they may perform wire communication through an USB interface not shown in the figure.

Information of operations and entries (including a notification that a user has just operated an operation screen of the MFP 1 and the operations of pressing of an operation key, selecting a document, selecting a job, and the like; and further including, while the cooperation with the portable 2 is active, a notification that a user has just operated an operation screen of the portable terminal 2) is transferred to the major function controller 101a through the input and output information controller 101b of the main controller 101. Recognizing that the user intends to start the cooperation with the portable terminal 2, the major function controller 101a reads out necessary information from the memory 104 and starts the cooperation.

After that, the MFP 1 obtains screen data for reproducing an operation screen of the portable terminal 2, from the portable terminal 2, and displays the operation screens of the MFP 1 itself and the portable terminal 2 together side by side on the display portion 105b of the operation panel 105.

The major function controller 101a recognizes that the user has just operated the operation screen of the portable terminal 2 on the basis of the operation information input through the input and output information controller 101*b*, for example. When the portable terminal 2 has a cooperation table on the memory 202, the major function controller 101*a* then transfers to the portable terminal 2, operation information indicating the detail of the user's operation, and in return, receives a notification of a potential next operation identified by the portable terminal 2 by reference to the cooperation table stored on the memory 22. When the MFP 1 has a cooperation table on the memory 104, the major function controller 101*a* then transfers to the portable terminal 2, a notification of a user's operation, and in return, receives the detail of the user's operation from the portable terminal 2. By reference to the cooperation table stored on the memory 104, the major function controller 101*a* identifies a potential next operation as corresponding to the user's operation.

The major function controller 101*a* further selects or detects a suitable operation screen for the user's operation or the potential next operation among those on the memory 104 and displays the suitable operation screen on the display portion 105*b* of the operation panel 105.

If the user has not updated a cooperation table of the MFP 1 after adding a new function to the portable terminal 2 by installing new application software or enhancing an existing function of the portable terminal 2 by updating the version of application software, the MFP 1 receives a notification stating that the cooperation table has not been updated yet, from the cooperation software of the portable terminal 2 when starting the cooperation with the portable terminal 2.

The major function controller 101*a* detects address information of a new cooperation table server from the memory 104 and accesses the new cooperation table server by the address information.

The major function controller 101*a* examines whether or not the server has a new cooperation table also applicable for the new application software or the new version of application software. If the server has it, the controller 101 obtains (downloads) it therefrom to update its cooperation table with the new one and also transfers it to the portable terminal 2 to have the cooperation table of the portable terminal 2 updated with the new one. Here it should be noted that the cooperation table of the portable terminal 2 is updated by the cooperation software of the portable terminal 2.

Hereinafter, how the MFP 1 facilitates the cooperation with the portable terminal 2 is explained.

A user intends to remotely operate the MFP 1 from the portable terminal 2 by accessing the MFP 1 via a network. The user successfully starts the cooperation between the MFP 1 and the portable terminal 2 by activating cooperation software installed on the portable terminal 2.

Figure 5:
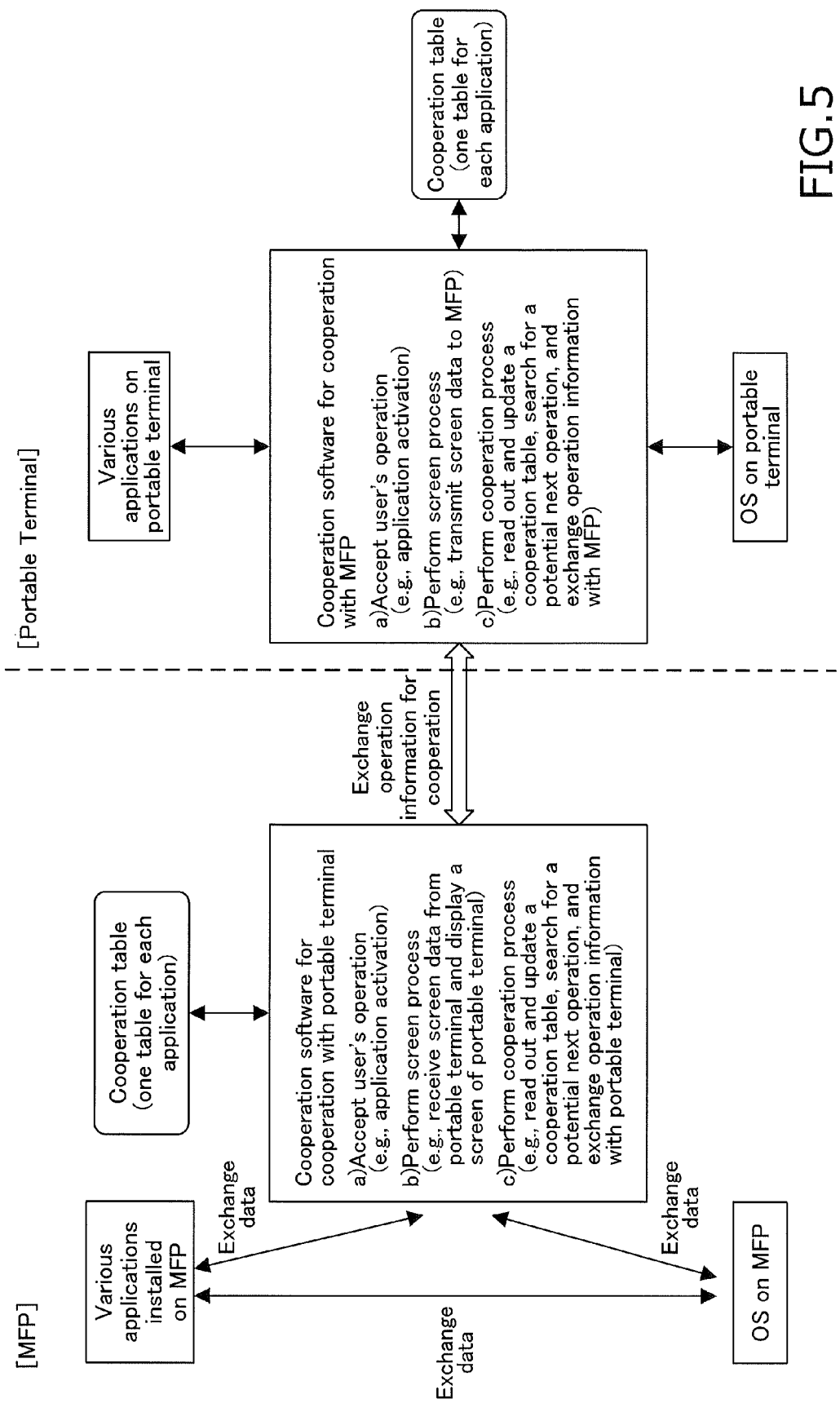
FIG. 5 illustrates the relationship among applications software of the image processing apparatus and the portable terminal apparatus.

FIG. 5 illustrates the relationship among software programs of the MFP 1 and the portable terminal 2; the software programs of the MFP 1 are shown on the left side of the operation screen and the software programs of the portable terminal 2 are shown on the right side of the operation screen.

With the cooperation software of the portable terminal 2 (for facilitating the cooperation with the MFP 1), which is positioned between an operating system (OS) of the portable terminal 2 and application software that is general-purpose, the MFP 1 is allowed to obtain operation information of the user, exchange data with the portable terminal 2, and receive screen data from the portable terminal 2 and the portable terminal 2 is allowed to transmit the information to the MFP 1 when necessary. In other words, the cooperation software of the portable terminal 2 accepts user instructions on the portable terminal 2, for example, instructions for activating application software; transmits to the MFP 1, screen data for reproducing an operation screen of the portable terminal 2; receives from the MFP 1, screen data for reproducing an operation screen of the MFP 1; displays the operation screen; and performs any other operations for facilitating the cooperation with the MFP 1. The any other operations include: calling a cooperation table; updating a present cooperation table; judging whether or not there is a potential next operation expected to follow the user's operation; and exchanging with the MFP 1, cooperation information indicating the detail of the cooperation.

If the MFP 1 is allowed to obtain all necessary information anytime because its OS and its general-purpose application software are all designed or customized in-house, the cooperation software of the MFP 1 (for facilitating the cooperation with the portable terminal 2) does not necessarily have to be positioned between the OS and the general-purpose application software. That is, the cooperation software of the MFP 1, which is completely independent of the OS and the general-purpose application software, may obtain all necessary information by communicating with the OS and the general-purpose application software. The cooperation software of the MFP 1 accepts user instructions on the MFP 1, for example, instructions for activating application software; receives from the portable terminal 2, screen data for reproducing an operation screen of the portable terminal 2; display the operation screen; transmits to the portable terminal 2, screen data for reproducing an operation screen of the MFP 1; and performs any other operations for facilitating the cooperation with the portable terminal 2. The any other operations include: calling a cooperation table; updating a present cooperation table; judging whether or not there is a potential next operation expected to follow the user's operation; and exchanging with the portable terminal 2, cooperation information indicating the detail of the cooperation.

The user gives instructions to start the cooperation with the MFP 1 by pressing a cooperation icon on an operation screen on the display portion 204 of the portable terminal 2. Then the cooperation software of the portable terminal 2 activates the cooperation software of the MFP 1 by communicating with the MFP 1 registered in advance. When the cooperation software of the MFP 1 is successfully activated, the cooperation mode is turned ON; the MFP 1 displays the operation screens of the MFP 1 itself and the portable terminal 2 together side by side on the display portion 105*b* and the portable terminal 2 also displays the both similarly on the display portion 204.

Figure 6:
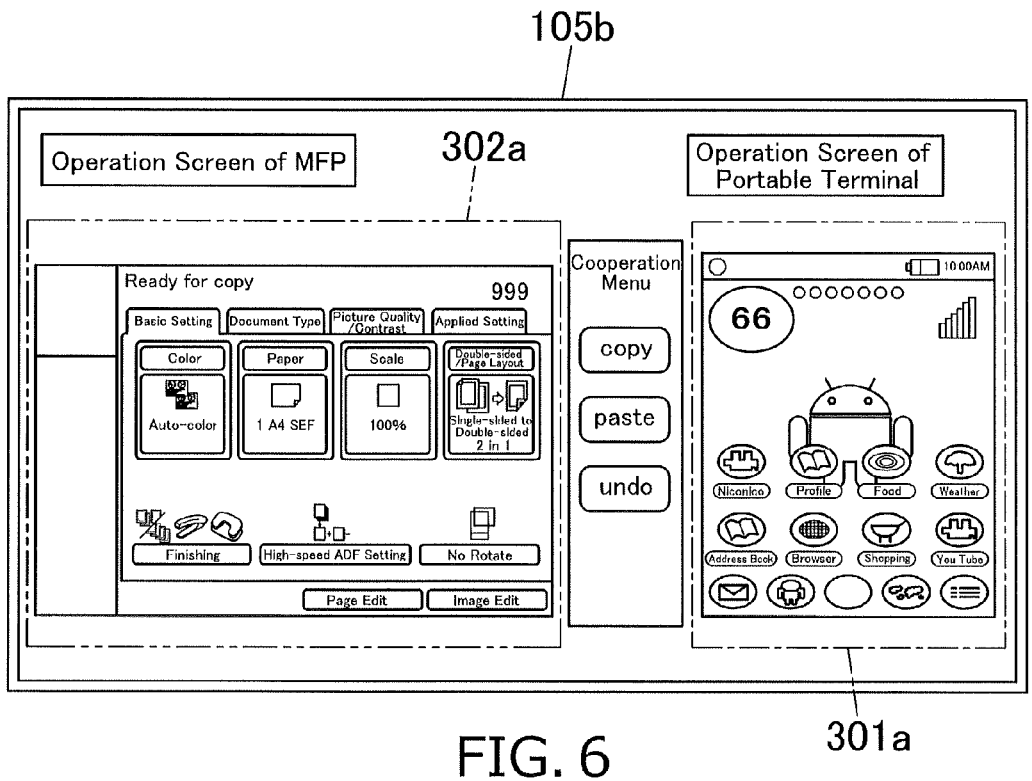
FIG. 6 illustrates different operation screens of the image processing apparatus and the portable terminal apparatus on a display portion of the image processing apparatus.

FIG. 6 illustrates different operation screens of the MFP 1 and the portable terminal 2 on the display portion 105*b* of the MFP 1. Hereinafter, the different operation screens are represented by an operation screen 301*a* of the portable terminal 2 and an operation screen 302*a* of the MFP 1.

When the user operates the operation screen 301*a* of the portable terminal 2 on the MFP 1, the MFP 1 transmits to the portable terminal 2, operation information indicating the detail of the user's operation.

The portable terminal 2 has a cooperation table stored in advance on the memory. Receiving the operation information, the portable terminal 2 identifies a potential next operation as corresponding to the user's operation among those in the cooperation table and transmits a notification of the potential next operation to the MFP 1.

There is one cooperation table for each application software program installed on the portable terminal 2. "No potential next operation" in this figure means that the cooperation table does not contain any potential next operation registered.

Receiving a notification of the potential next operation from the portable terminal 2, the MFP 1 switches the operation screen of itself to a suitable operation screen.

For example, the user gives instructions to show information of a certain person by pressing an address book icon on an operation screen 301b of the portable terminal 2. Receiving from the MFP 1, operation information indicating the content of the user's operation, the cooperation software of the portable terminal 2 identifies a potential next operation as corresponding to the user's operation, among those in the cooperation table. In this example, the potential next operation is "scan to e-mail" for transmitting image data obtained with the scanner 102, by electronic mail (to a registered address or a new address). The cooperation software of the portable terminal 2 transmits a notification of "scan to e-mail" to the MFP 1. The cooperation software of the portable terminal 2 also transmits information of the user's specified person to the MFP 1 as well.

Receiving a notification of the potential next operation from the portable terminal 2, the MFP 1 switches the operation screen of itself to a suitable operation screen. Here, on the basis of the information of the user's specified person, which is received from the portable terminal 2, the MFP 1 examines whether or not any individual record in an address book stored on the memory 104 is matched to the user's specified person. The address book has user addresses registered in advance. The MFP 1 examines whether or not any individual record in the address book is matched to the operator user who operates the operation screen 301b.

Here, the user who operates the operation screen 301b is an authorized user of the MFP 1 who remotely operates the portable terminal 2 by the cooperation software of the portable terminal 2, which means that the MFP 1 already has information of the operator user.

Figure 7:
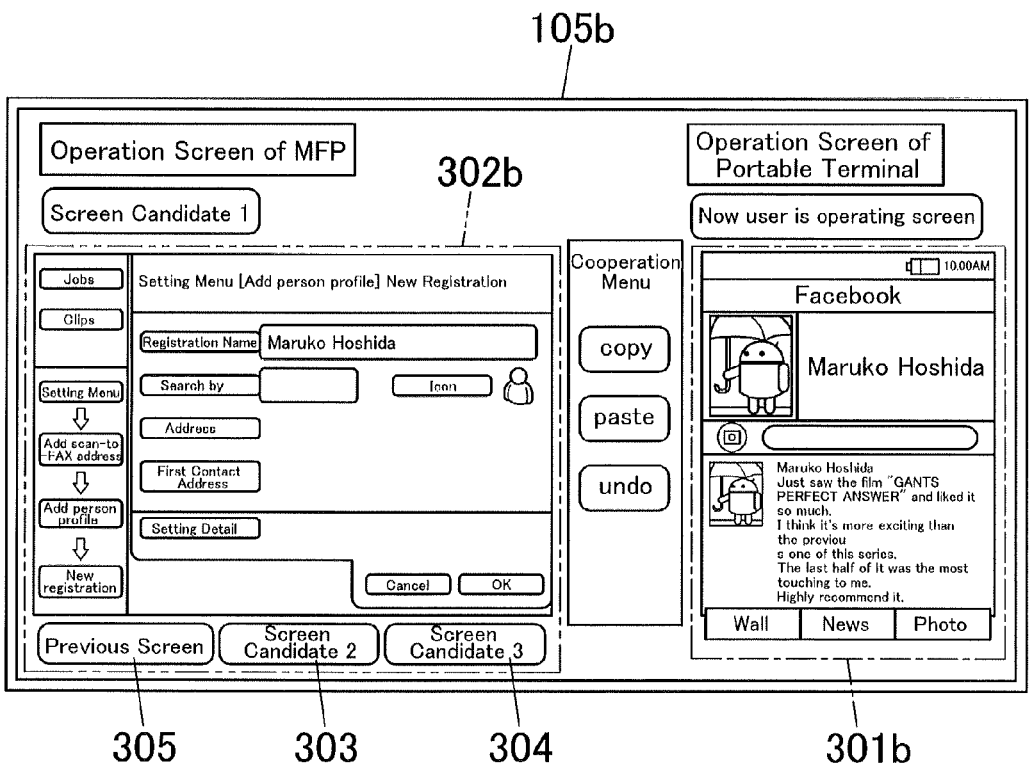
FIG. 7 illustrates that the operation screen of the image processing apparatus proceeds to next step after the view of FIG. 6.

If there is no matched record as the result of the examination, the MFP 1 selects an address entry screen as a suitable operation screen for the potential next operation "scan to e-mail" and switches the operation screen 302b to an address entry screen as shown on the left side of the operation screen in FIG. 7. If there is a matched record, the MFP 1 selects an e-mail transmission screen as a suitable operation screen for "scan to e-mail" and switches the operation screen 302b to an e-mail transmission screen with the operator user's address being inserted already. As described above, the MFP 1 selects either an address entry screen or an e-mail transmission screen on the basis of the information of the operator user who operates an operation screen of the portable terminal 2, i.e.; the MFP 1 displays different suitable operation screen depending on the user.

Furthermore, if there is more than one suitable operation screen for more than one potential next operation or only one potential next operation identified, the MFP 1 displays the first candidate screen and also displays, on the lower side of the operation screen, call buttons 303 and 304 for switching the first candidate screen to the second and third candidate screens, respectively, as illustrated in FIG. 7.

When the user presses the call button 303 or 304, the MFP 1 switches the first candidate screen to the second or third candidate screen.

There may be a "Previous Screen" button 305 as shown in FIG. 7 so that the user can press when he/she wants to return to the previous operation screen without operating any of the candidate operation screens.

In this embodiment as described above, the portable terminal 2 has a cooperation table while the MFP 1 does not for example. Alternatively, the MFP 1 may have a cooperation table while the portable terminal 2 does not; if so, instead of the portable terminal 2, it is the MFP 1 which identifies a potential next operation as corresponding to the user's operation on the operation screen of the portable terminal 2. In this case, the portable terminal 2 transmits to the MFP 1, the detail of the user's operation on the operation screen of the portable terminal 2 and the MFP 1 identifies a potential next operation as corresponding to the user's operation, among those in its cooperation table. Then the MFP 1 switches the operation screen of itself to a suitable operation screen for the potential next operation (to the first candidate screen if there is more than one suitable operation screen).

In this embodiment as described above, the user operates an operation screen of the portable terminal 2 on the display portion 105b of the MFP 1 for example. Alternatively, the user may operate an operation screen of the portable terminal 2 on the display portion 204 of the portable terminal 2; that is, he/she may operate it from whichever display portion because the MFP 1 and the portable terminal 2 then perform the same operations as described in this embodiment.

Figure 8:
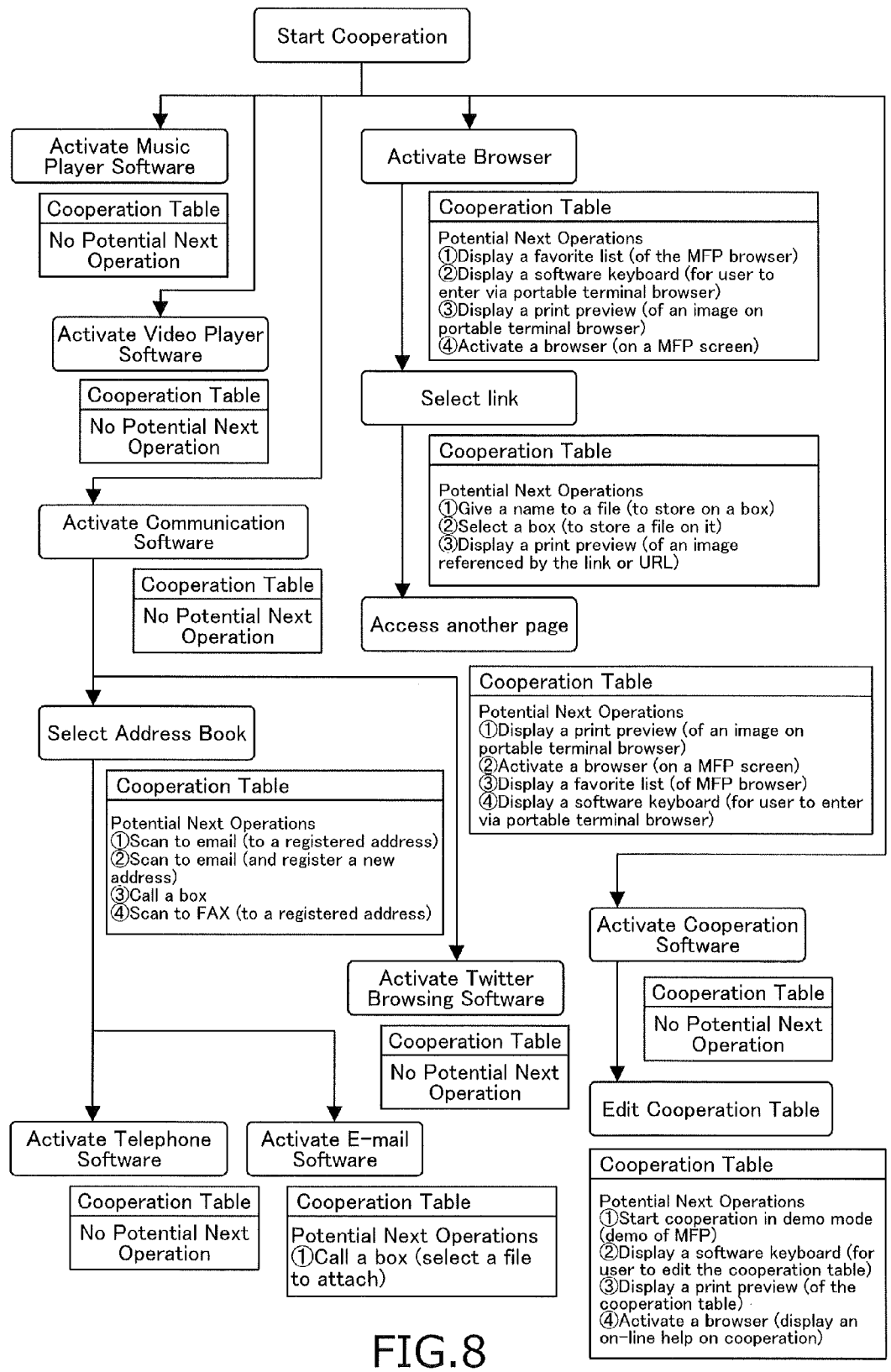
FIG. 8 is a cooperation table that contains the detail of operations on the operation screen of the portable terminal apparatus and potential next operations most likely expected to follow the operations.

FIG. 8 is a flowchart accompanied with a cooperation table that contains the detail of operations on an operation screen of the portable terminal 2 and potential next operations most likely expected to follow the operations.

When a user activates a browser by operating an operation screen of the portable terminal 2, the cooperation table suggests the following candidates as potential next operations of the MFP 1 corresponding to the browser activation: 1) display a favorite list of the MFP browser; 2) display a software keyboard; 3) display a print preview of an image displayed on the portable terminal browser; and 4) activate a browser. Accordingly when the user activates a browser by operating an operation screen of the portable terminal 2, the MFP 1 switches the operation screen of itself to a screen with a favorite list of the MFP browser. The MFP 1 also displays call buttons for calling suitable operation screens for the second, third, and fourth candidates as potential next operations.

Similarly, when the user selects a link by operating an operation screen of the portable terminal 2, the cooperation table suggests the following candidates as potential next operations corresponding to the link selection: 1) give a file name to a file to be in a box; 2) select a box; and 3) display a print preview.

When a user accesses another page by operating an operation screen of the portable terminal 2, the cooperation table suggests the following candidates as potential next operations corresponding to the page access: 1) display a print preview; 2) activate a browser; 3) display a favorite list; and 4) display a software keyboard.

When a user edits a cooperation table by operating an operation screen of the portable terminal 2, the cooperation table suggests the following candidates as potential next operations corresponding to the cooperation table edit: 1) start cooperation in demo mode; 2) display a software keyboard; 3) display a print preview; and 4) activate a browser.

When a user selects an address book by operating an operation screen of the portable terminal 2, the cooperation table suggests the following candidates as potential next operations corresponding to the address selecting: 1) scan to e-mail to a registered address; 2) register a new address; 3) call a box; and 4) scan to FAX to a registered address.

When a user selects e-mail software by operating an operation screen of the portable terminal 2, the cooperation table suggests the following candidate as a potential next operation corresponding to the e-mail software selecting: 1) call a box.

When a user activates cooperation software, music player software, video player software, communication software, Twitter browsing software, or telephone software, the cooperation table suggests no potential next operation corresponding to any of these operations.

FIGS. 9 to 12 are flowcharts that represent the control operations how to display operation screens while the cooperation is active. In the examples to be explained with the flowcharts of FIGS. 9 to 12, when a user operates an operation screen of the portable terminal 2 on the display portion 105b of the MFP 1, the MFP 1 switches an operation screen of the MFP 1 itself on the display portion 105b to another operation screen while there is no description about an operation screen of the MFP 1 on the display portion 204 of the portable terminal 2; however, it should be understood here that, needless to say, the portable terminal 2 displays operation screens of the MFP 1 and the portable terminal 2 itself together on the display portion 204 just like the MFP 1, and when a user operates the operation screen of the portable terminal 2 on the display portion 204, the portable terminal 2 switches the operation screen of the MFP 1 on the display portion 204 to another operation screen just like the MFP 1.

Here, for reduction in power consumption, when a user operates an operation screen of the portable terminal 2 on the display portion 105b of the MFP 1, the portable terminal 2 may hide operation screens of the MFP 1 and the portable terminal 2 itself while the MFP 1 switches an operation screen of the MFP 1 itself on the display portion 105b to another operation screen; when a user operates an operation screen of the portable terminal 2 on the display portion 204, the MFP 1 may hide operation screens of the MFP 1 itself and the portable terminal 2 while the portable terminal 2 switches an operation screen of the MFP 1 on the display portion 204 to another operation screen.

Figure 9:
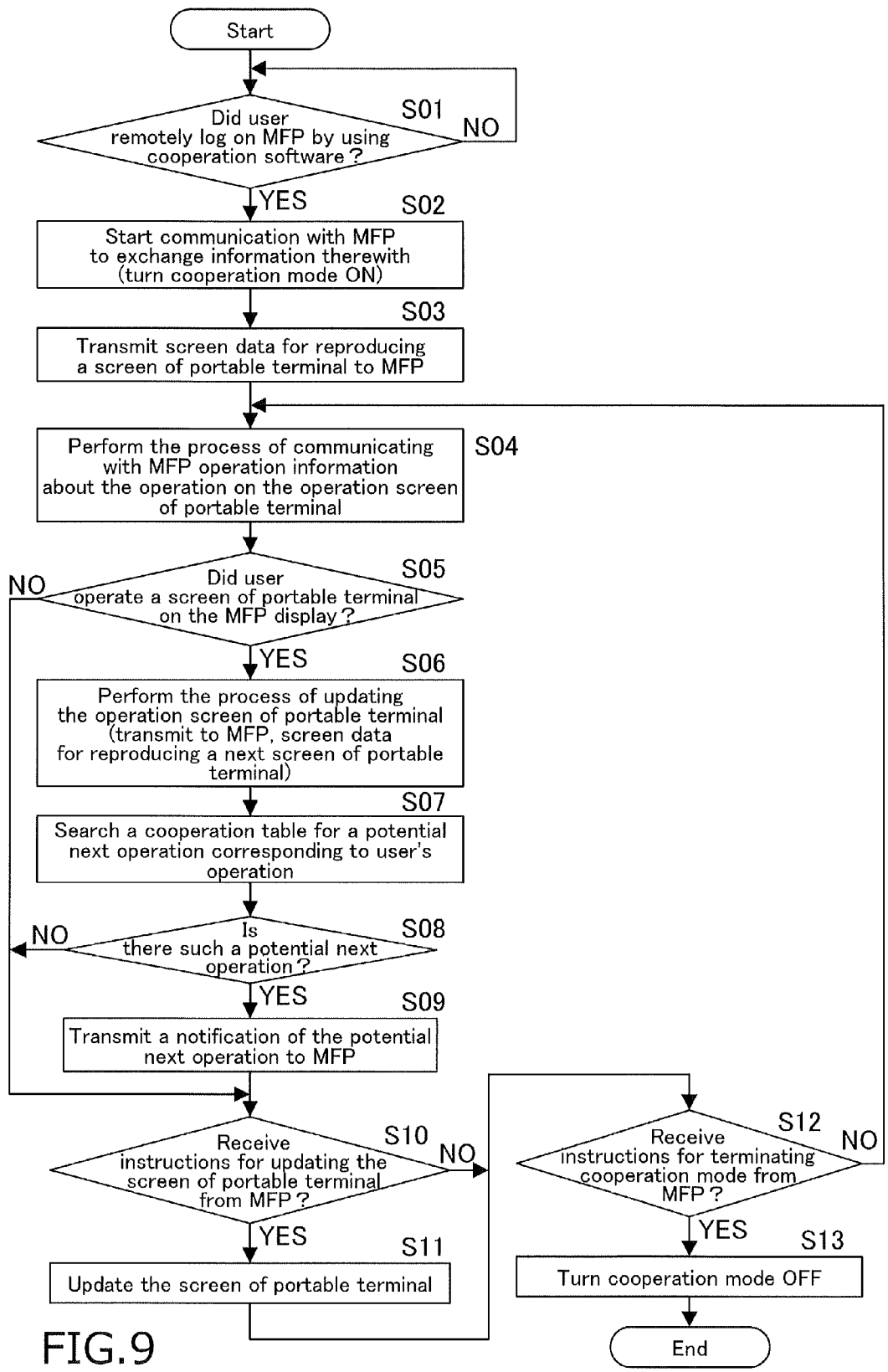
FIG. 9 is a flowchart that represents the operations of the portable terminal apparatus when the portable terminal apparatus has a cooperation table.
Figure 10:
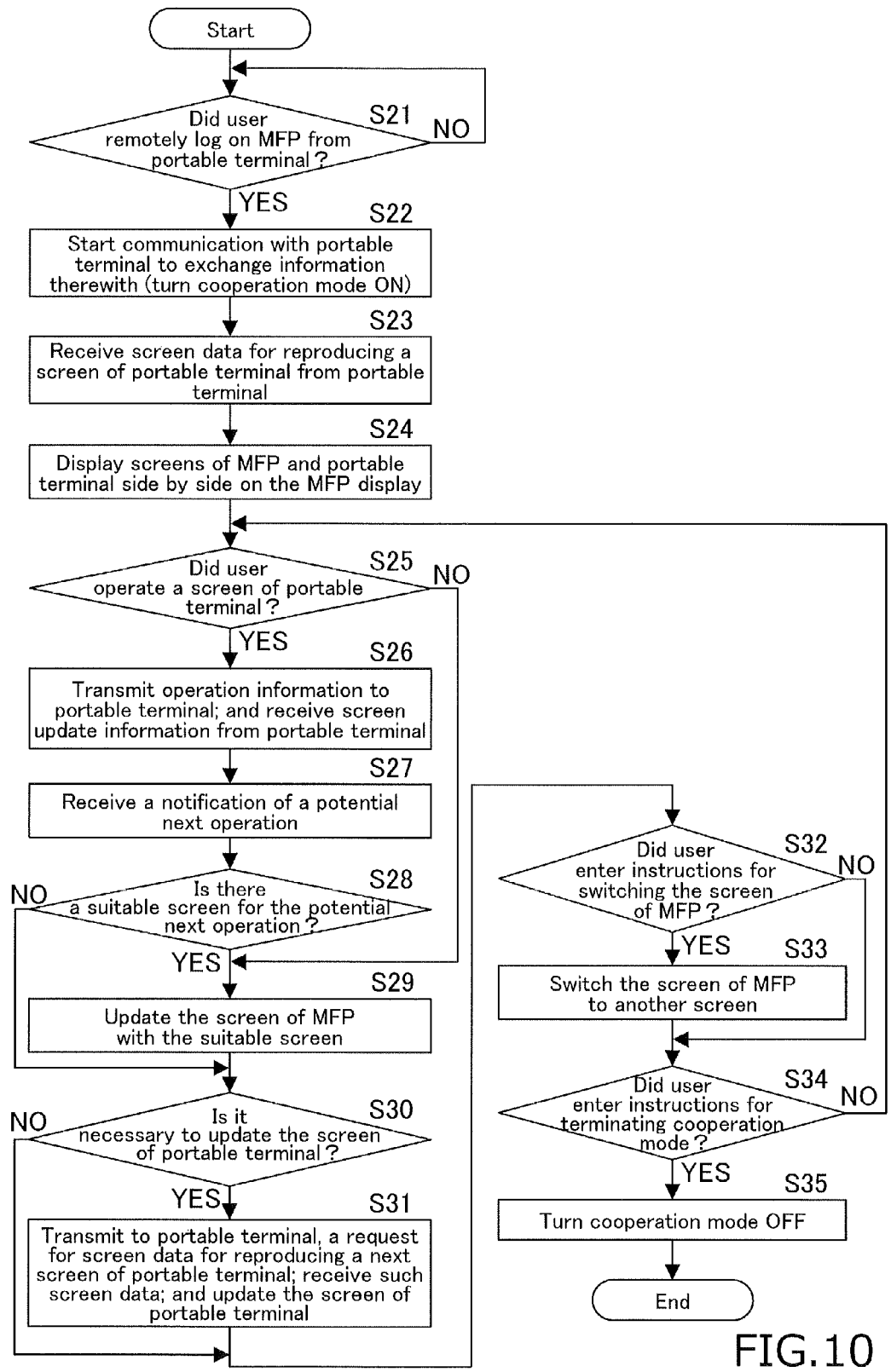
FIG. 10 is a flowchart that represents the operations of the image processing apparatus when the portable terminal apparatus has a cooperation table.

FIG. 9 is a flowchart that represents the operations of the portable terminal 2 when the portable terminal 2 has a cooperation table; FIG. 10 is a flowchart that represents the operations of the MFP 1 when the portable terminal 2 has a cooperation table. The operations to be explained with the flowcharts in FIGS. 9 to 12 are executed by the CPUs of the main controller 101 and the main controller 201 in accordance with cooperation software stored on the ROMs of the MFP 1 and the portable terminal 2 or the memories 104 and 202, respectively.

Hereinafter, FIG. 9 will be explained: the routine waits for the user to log on the MFP 1 from the portable terminal 2, using cooperation software that serves for the cooperation with the MFP 1 (NO in Step S01); when the user logs on the MFP 1 (YES in Step S01), the portable terminal 2 turns the cooperation mode ON in Step S02. Specifically, the portable terminal 2 starts communicating with the MFP 1 to exchange information therewith.

Subsequently, the portable terminal 2 transmits to the MFP 1, screen data for reproducing an operation screen of the portable terminal 2 in Step S03. On the basis of the screen data, the MFP 1 displays the operation screen of the portable terminal 2 on the display portion 105b.

In Step S04, the portable terminal 2 performs the process of communicating with the MFP 1 operation information about the operation on the operation screen of the portable terminal 2, in other words, receives a notification that the user has just operated the operation screen of the portable terminal 2 and operation information indicating the content of the user's operation. It is then judged in Step S05 whether or not the user has just operated the operation screen of the portable terminal 2. If the user has not operated yet (NO in Step S05), the routine proceeds to Step S10. If the user has just operated (YES in Step S05), the routine proceeds to Step S06.

In Step S06, the portable terminal 2 performs the process of updating the operation screen of the portable terminal 2, in other words, transmits to the MFP 1 screen data for reproducing a next operation screen of the portable terminal 2. On the basis of the screen data, the MFP 1 updates the operation screen of the portable terminal 2 with the next operation screen.

Subsequently, the portable terminal 2 searches the cooperation table for a potential next operation that corresponds to the user's operation on the operation screen of the portable terminal 2, in Step S07. It is then judged in Step S08 whether or not there is such a potential next operation in the cooperation table. If there is such a potential next operation (YES in Step S08), the portable terminal 2 identifies the potential next operation and transfers the potential next operation to the MFP 1 in Step S09. Then the routine proceeds to Step S10. If there is no such potential next operation (NO in Step S10), the routine proceeds to Step S10.

In Step S10, in order to show a message for the user from the MFP 1, it is judged whether or not to receive from the MFP 1, instructions for updating the operation screen of the portable terminal 2. If such instructions are received (YES in Step S10), the routine proceeds to Step S11, in which: the portable terminal 2 further receives from the MFP 1, screen update information (a message for the user and the like) from the MFP 1 and transmits to the MFP 1, updated screen data for reproducing a next operation screen of the portable terminal 2. Then the routine proceeds to Step S12. If there are no such instruction (NO in Step S10), the routine proceeds to Step S12.

In Step S12, it is judged whether or not to receive instructions for terminating the cooperation mode from the MFP 1. If there are no such instructions (NO in Step S12), the routine returns to Step S04. If there are such instructions (YES in Step S12), the routine proceeds to Step S13, in which the cooperation mode is turned OFF, i.e.; the operation screen of the portable terminal 2 disappears from the display portion 105b of the MFP 1. Then the routine terminates.

Hereinafter, FIG. 10 will be explained: the routine waits for the user to log on the MFP 1 from the portable terminal 2 (NO in Step S21); when the user logs on the MFP 1 (YES in Step S21), the MFP 1 turns the cooperation mode ON in Step S22. Specifically, the MFP 1 starts communicating with the portable terminal 2 to exchange information therewith.

Subsequently, the MFP 1 receives from the portable terminal 2, screen data for reproducing an operation screen of the portable terminal 2 in Step S23 and displays the operation screens of the MFP 1 itself and the portable terminal 2 together side by side on the display portion 105b in Step S24.

It is then judged in Step S25 whether or not the user has just operated the operation screen of the portable terminal 2. If the user has not operated yet (NO in Step S25), the routine proceeds to Step S29. If the user has just operated (YES in Step S25), the routine proceeds to Step S26, in which: the MFP 1 transmits to the portable terminal 2, operation information on the operation screen of the portable terminal 2; receives from the portable terminal 2, screen update information (i.e., screen data for reproducing a next operation screen of the portable terminal 2); and updates the operation screen of the portable terminal 2 with the next operation screen.

Subsequently, the MFP 1 further receives a potential next operation that corresponds to the user's operation in Step S27. It is then judged in Step S28 whether or not there is a suitable operation screen for the potential next operation. If there is such a suitable operation screen (YES in Step S28), the routine proceeds to Step S29, in which the MFP 1 updates the operation screen of itself with the suitable operation screen. Then the routine proceeds to Step S30. Here, if there is more than one suitable operation screen for the potential next operation, the MFP 1 displays the first candidate screen with call buttons for switching the first candidate screen to the other candidate screens. If there is no such suitable operation screen (NO in Step S28), the routine proceeds to Step S30.

In Step S30, it is judged whether or not updating the operation screen of the portable terminal 2 is necessary. If it is necessary (YES in Step S30), the routine proceeds to Step S31, in which the MFP 1 transmits to the portable terminal 2, a request for screen data for reproducing a next operation screen of the portable terminal 2, receives the screen data therefrom, and updates the operation screen of the portable terminal 2 with the next operation screen. Then the routine proceeds to Step S32. If it is not necessary (NO in Step S30), the routine proceeds to Step S32.

In Step S32, it is judged whether or not the user gives instructions for switching the operation screen of the MFP 1. The user may give such instructions by pressing a call button for switching the first candidate screen to the other or one of the other candidate screens or pressing a "Previous Screen" button, for example.

If the user gives such instructions (YES in Step S32), the MFP 1 switches the operation screen of itself to the next operation screen in Step S33. Then the routine proceeds to Step S34. If the user does not give such instructions (NO in Step S32), the routine proceeds to Step S34.

In Step S34, it is judged whether or not to receive instructions for terminating the cooperation mode. If there are no such instructions (NO in Step S34), the routine returns to Step S25. If there are such instructions (YES in Step S34), the routine proceeds to Step S35, in which the cooperation mode is turned OFF, i.e.; the MFP 1 displays an ordinary operation screen of the MFP 1 on the display portion 105b. Then the routine terminates.

When the user enters a certain instruction from the suitable operation screen for the potential next operation, the MFP 1 performs processing for example: executes jobs and registers addresses, in accordance with the user instruction.

As described above, in this embodiment, the portable terminal 2 has a cooperation table that contains the detail of operations on an operation screen of the portable terminal 2 and potential next operations most likely expected to follow the operations, both of which are stored on the memory 202. When a user operates the operation screen of the portable terminal 2 on the display portion 105b of the MFP 1, the portable terminal 2 identifies a potential next operation as corresponding to the user's operation by searching the cooperation table, and transmits a notification of the potential next operation to the MFP 1. Receiving the potential next operation from the portable terminal 2, the MFP 1 switches the operation screen of itself on the display portion 105b, to a suitable operation screen for the potential next operation.

In other words, only by storing in advance on the portable terminal 2, operations on operation screens of the portable terminal 2 and potential next operations most likely expected to follow the operations, when a user operates an operation screen of the portable terminal 2 on the display portion 105b, the MFP 1 is allowed to switch the operation screen of itself to a suitable operation screen for the user's operation. Thus users can display a preferred operation screen of the MFP 1 pretty easily without the need for troublesome manual operation.

Figure 11:
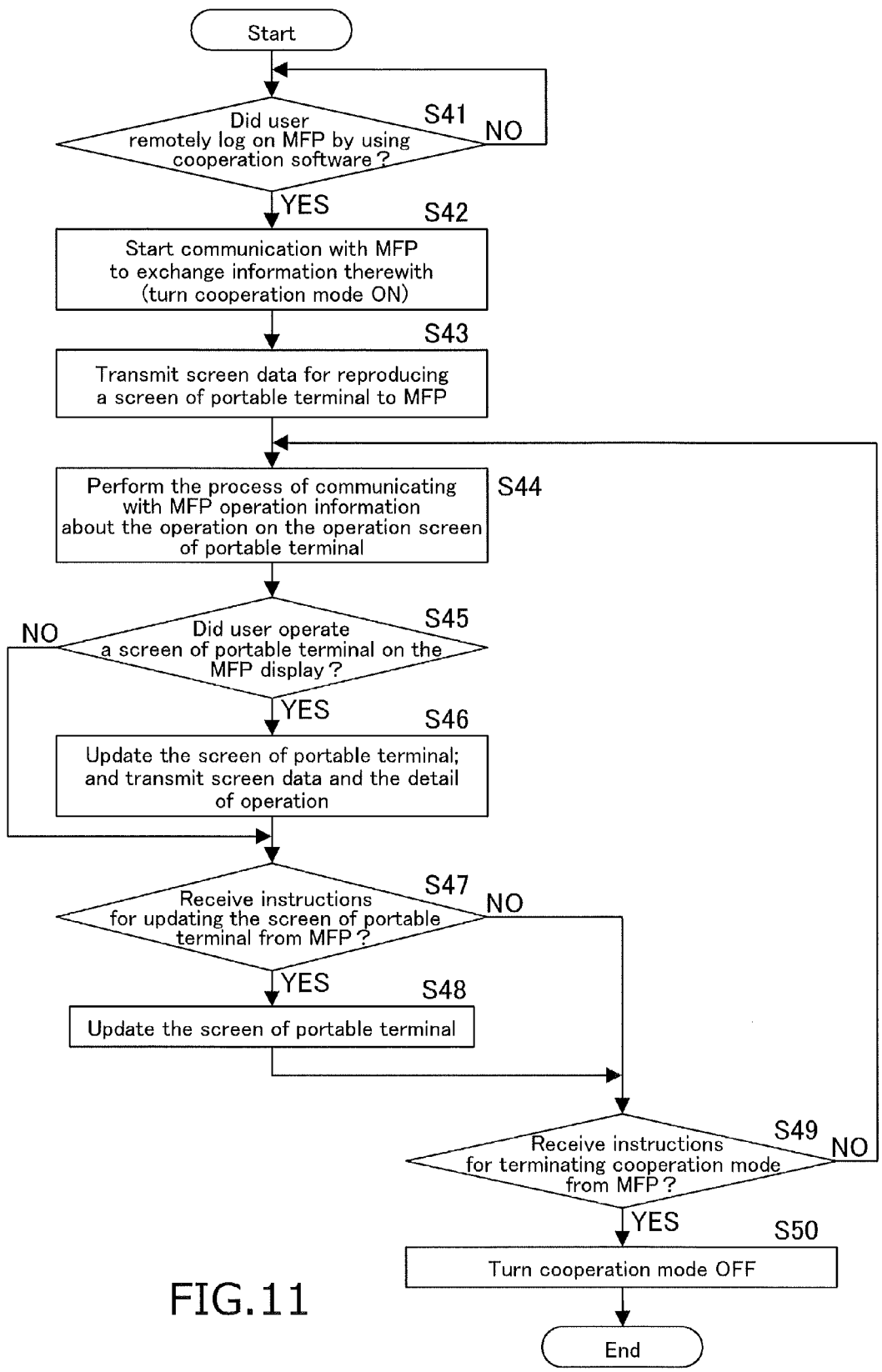
FIG. 11 is a flowchart that represents the operations of the portable terminal apparatus when the image processing apparatus has a cooperation table.
Figure 12:
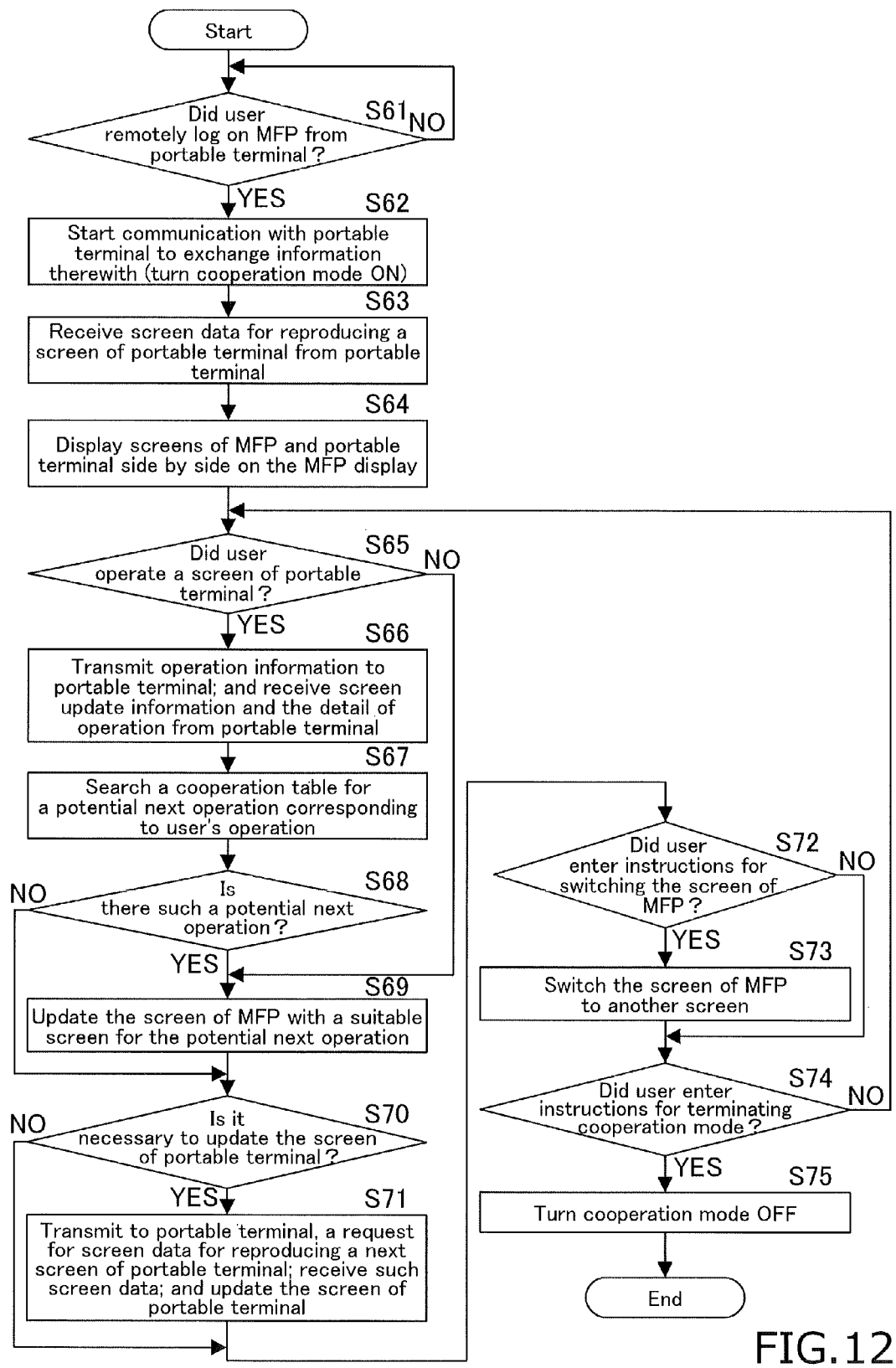
FIG. 12 is a flowchart that represents the operations of the image processing apparatus when the image processing apparatus has a cooperation table.

FIG. 11 is a flowchart representing the operations to be performed by the portable terminal 2 when the MFP 1 has the cooperation table; FIG. 12 is a flowchart representing the operations to be performed by the MFP 1 when the MFP 1 has the cooperation table.

Hereinafter, FIG. 11 will be explained: the routine waits for the user to log on the MFP 1 from the portable terminal 2, using cooperation software that serves for the cooperation with the MFP 1 (No in Step S41); when the user logs on the MFP 1 (YES in Step S41), the portable terminal 2 turns the cooperation mode ON in Step S42. Specifically, the portable terminal 2 starts communicating with the MFP 1 to exchange information therewith.

Subsequently, the portable terminal 2 transmits to the MFP 1, screen data for reproducing an operation screen of the portable terminal 2 in Step S43. On the basis of the screen data, the MFP 1 displays the operation screen of the portable terminal 2 on the display portion 105b.

In Step S44, the portable terminal 2 performs the process of communicating with the MFP 1 operation information about the operation on the operation screen of the portable terminal 2, in other words, receives a notification that the user has just operated the operation screen of the portable terminal 2 and operation information indicating the content of the user's operation. It is then judged in Step S45 whether or not the user has just operated the operation screen of the portable terminal 2. If the user has not operated yet (No in Step S45), the routine proceeds to Step S47. If the user has just operated (YES in Step S45), the routine proceeds to Step S46, in which: the portable terminal 2 updates the operation screen of itself and transmits to the MFP 1, screen data for reproducing a next operation screen and the detail of the user's operation. Then the routine proceeds to Step S47.

In Step S47, it is judged whether or not to receive from the MFP 1, instructions for updating the operation screen of the MFP 1; and also, in order to show a message for the user from the MFP 1, it is judged whether or not to receive from the MFP 1, instructions for updating the operation screen of the portable terminal 2. If there are instructions for updating the operation screen of either of the MFP 1 and the portable terminal 2 (YES in Step S47), the portable terminal 2 performs update operation in Step S48. Specifically, the portable terminal 2 further receives from the MFP 1, screen data for reproducing a next operation screen of the MFP 1 and updates the operation screen; or alternatively the portable terminal 2 further receives a message for the user from the MFP 1 and transmits to the MFP 1, screen data for reproducing a next operation screen of the portable terminal 2. Then the routine proceeds to Step S49. If there are no such instructions (NO in Step S47), the routine proceeds to Step S49.

In Step S49, it is judged whether or not to receive instructions for terminating the cooperation mode from the MFP 1. If there are no such instructions (NO in Step S49), the routine returns to Step S44. If there are such instructions (YES in Step S49), the routine proceeds to Step S50, in which the cooperation mode is turned OFF, i.e.; the operation screen of the portable terminal 2 disappears from the display portion 105b of the MFP 1 and the operation screen of the MFP 1 disappears from the display portion 204 of the portable terminal 2. Then the routine terminates.

Hereinafter, FIG. 12 will be explained: the routine waits for the user to log on the MFP 1 from the portable terminal 2 (NO in Step S61); when the user logs on the MFP 1 (YES in Step S61), the MFP 1 turns the cooperation mode ON in Step S62. Specifically, the MFP 1 starts communicating with the portable terminal 2 to exchange information therewith.

Subsequently, the MFP 1 receives from the portable terminal 2, screen data for reproducing an operation screen of the portable terminal 2 in Step S63, and displays the operation screens of the MFP 1 itself and the portable terminal 2 together side by side on the display portion 105b in Step S64.

It is then judged in Step S65 whether or not the user has just operated the operation screen of the portable terminal 2. If the user has not operated yet (NO in Step S65), the routine proceeds to Step S69. If the user has just operated (YES in Step S65), the routine proceeds to Step S66, in which: the MFP 1 transmits to the portable terminal 2, operation information about the operation on the operation screen of the portable terminal 2; receives from the portable terminal 2, screen update information (i.e., screen data for reproducing a next operation screen of the portable terminal 2) and the detail of the user's operation; and updates the operation screen of the portable terminal 2 with the next operation screen.

Subsequently, the MFP 1 searches the cooperation table, which is stored on the memory 104, for a potential next operation that corresponds to the user's operation on the operation screen of the portable terminal 2, in Step S67. It is then judged in Step S68 whether or not there is such a potential next operation in the cooperation table. If there is such a suitable operation screen (YES in Step S68), this means that the MFP 1 successfully identifies the suitable operation screen. And thus in Step S69, the MFP 1 updates the operation screen of itself with the suitable operation screen. Then the routine proceeds to Step S70. If there is no such potential next operation (NO in Step S68), the routine proceeds to Step S70.

In Step S70, it is judged whether or not it is necessary to update the operation screen of the portable terminal 2 on the display portion 105*b*. If it is necessary (YES in Step S70), the routine proceeds to Step S71, in which the MFP 1 transmits to the portable terminal 2, a request for screen data for reproducing a next operation screen of the portable terminal 2; receives the screen data therefrom; and updates the operation screen of the portable terminal 2 with the next operation screen. Then the routine proceeds to Step S72. If it is not necessary (NO in Step S70), the routine proceeds to Step S72.

In Step S72, it is judged whether or not the user gives instructions for switching the operation screen of the MFP 1. The user may give such instructions by pressing a call button for switching the first candidate screen to the other or one of the other candidate screens or pressing a "Previous Screen" button, for example.

If the user gives such instructions (YES in Step S72), the MFP 1 switches the operation screen of itself to the next operation screen in Step S73. Then the routine proceeds to Step S74. If the user does not give such instructions (NO in Step S72), the routine proceeds to Step S74.

In Step S74, it is judged whether or not to receive instructions for terminating the cooperation mode. If there are no such instructions (NO in Step S74), the routine returns to Step S65. If there are such instructions (YES in Step S74), the routine proceeds to Step S75, in which the cooperation mode is turned OFF, i.e.; the MFP 1 displays an ordinary operation screen of the MFP 1 on the display portion 105*b*. Then the routine terminates.

As described above, in this embodiment, the MFP 1 has a cooperation table that contains the detail of operations on an operation screen of the portable terminal 2 and potential next operations most likely expected to follow the operations, both of which are stored in advance on the memory 104. When a user operates the operation screen of the portable terminal 2 on the display portion 105*b* of the MFP 1, the portable terminal 2 transmits the detail of the user's operation to the MFP 1, and the MFP 1 identifies a potential next operation as corresponding to the user's operation by searching the cooperation table. And the MFP 1 switches the operation screen of itself on the display portion 105*b* to a suitable operation screen for the potential next operation.

In other words, only by storing in advance on the MFP 1, operations on operation screens of the portable terminal 2 and potential next operations most likely expected to follow the operations, when a user operates an operation screen of the portable terminal 2 on the display portion 105*b*, the MFP 1 is allowed to switch the operation screen of itself to a suitable operation screen for the user's operation. Thus users can display a preferred operation screen of the MFP 1 pretty easily without the need for troublesome manual operation.

Hereinafter, how to update the cooperation table will be described.

When a user installs a new application software on the portable terminal 2, and when existing application software of the portable terminal 2 is updated with a new version, respectively, the portable terminal 2 can detect that a new function has been added by the installation and an existing function of itself has been enhanced by the version update, with its cooperation software. A cooperation table can be updated by any of the following methods:

[1] When the user started the cooperation with the MFP 1 next time, the portable terminal 2 transmits to the MFP 1, a request to obtain a new cooperation table that is also applicable for the new or enhanced function. The MFP 1 has information of a new cooperation table server, registered in advance on the memory 104. By accessing the new cooperation table server, the MFP 1 obtains a new cooperation table that is also applicable for the new or enhanced function. If only the portable terminal 2 has a cooperation table, the MFP 1 transfers the new cooperation table to the portable terminal 2 to have the cooperation table updated with the new one. If only the MFP 1 has a cooperation table, the MFP 1 updates its cooperation table with the new one. If both the MFP 1 and the portable terminal 2 have a cooperation table, they update their cooperation tables with the new one.

[2] The portable terminal 2 has information of a new cooperation table server, registered in advance on the memory 202. By accessing the new cooperation table server, the portable terminal 2 obtains a new cooperation table that is also applicable for the new or enhanced function.

Figure 13:
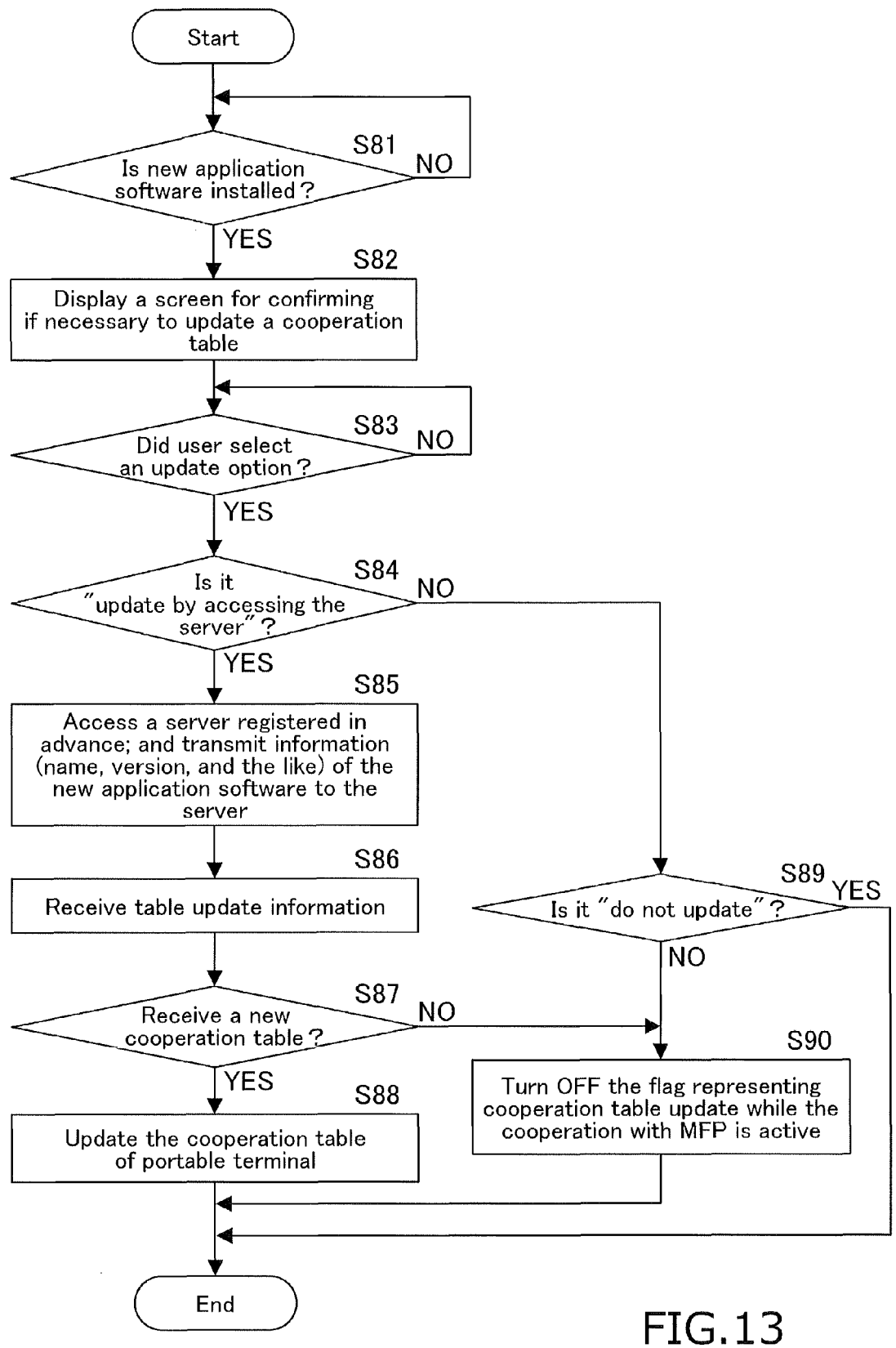
FIG. 13 is a flowchart that represents the operations how the portable terminal apparatus updates its cooperation table.

FIG. 13 is a flowchart that represents the operations how the portable terminal 2 updates its cooperation table.

In Step S81, the routine waits until new application software is installed (or existing application software is updated with a new version) on the portable terminal 2 by the user (NO in Step S81). If it is installed (YES in Step S81), a confirmation screen to confirm with the user whether or not it is necessary to update a cooperation table is displayed on the display portion 105*b* of the MFP 1 in Step S82.

FIG. 14 illustrates an example of the confirmation screen. There is a message asking if it is necessary to update a cooperation table (in this figure, a suggestion to update cooperation software) in this confirmation screen. By ticking a checkbox, the user can select one of the following options: "update by accessing the server", "update by accessing the MFP 1", and "do not update (access neither of them)". In this example of FIG. 14, the user selects "update by accessing the server".

Back to FIG. 13, the routine waits until any of the update options is selected (NO in Step S83). When any of them is selected (YES in Step S83), then it is judged in Step S84 whether or not it is "update by accessing the server". If it is "update by accessing the server" (YES in Step S84), the routine proceeds to Step S85. If it is not "update by accessing the server" (NO in Step S84), the routine proceeds to Step S89.

In Step S85, the portable terminal 2 accesses the server registered in advance to give information of the new application software having been installed thereon (for example, name or version of the new application software). In return, the portable terminal 2 receives update information of the cooperation table in Step S86.

It is then judged in Step S87 whether or not to receive a new cooperation table from the server. Receiving it from the server (YES in Step S87), the portable terminal 2 updates its cooperation table with the new one in Step S88. If the portable terminal 2 does not receive it (No in Step S87), the routine proceeds to Step S90.

In Step S89, it is judged whether or not it is "do not update". If it is "do not update" (YES in Step S89), the routine terminates. If it is not "do not update" (NO in Step S89), in Step S90, the portable terminal 2 turns OFF the flag representing cooperation table update while the cooperation with the MFP 1 is active. Then the routine terminates.

Figure 15:
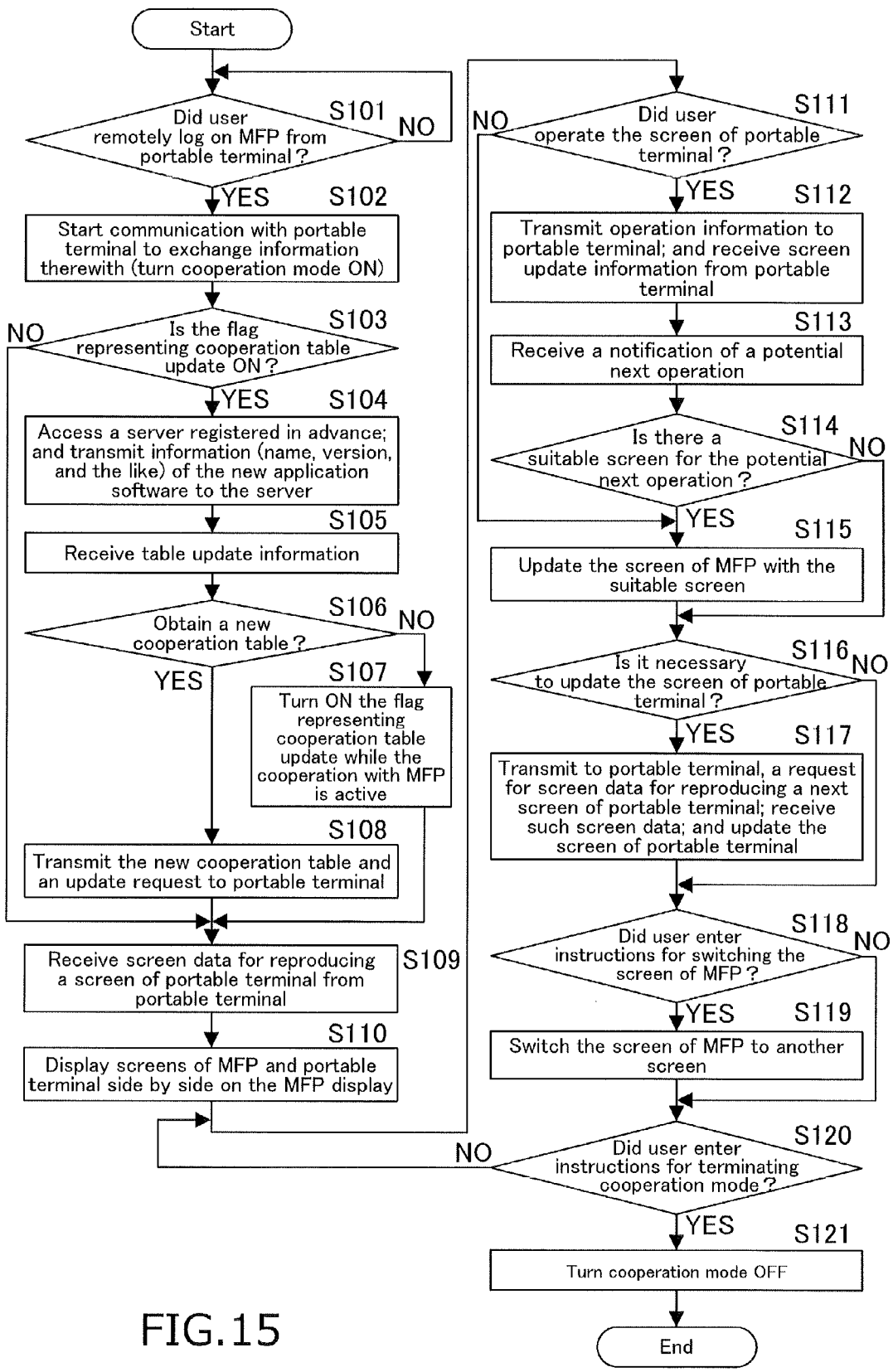
FIG. 15 is a flowchart that represents the operations how the image processing apparatus updates its cooperation table.

FIG. 15 is a flowchart that represents the operations how the MFP 1 updates its cooperation table.

The routine waits for the user to log on the MFP 1 from the portable terminal 2 (NO in Step S101); when the user logs on the MFP 1 (YES in Step S101), the MFP 1 turns the cooperation mode ON in Step S102. Specifically, the portable terminal 2 starts communicating with the MFP 1 to exchange information therewith.

In Step S103, it is judged whether or not the flag representing cooperation table update is ON. If it is not ON (NO in Step S103), the routine proceeds to Step S109. If it is ON (YES in Step S103), the routine proceeds to Step S104, in which the MFP 1 accesses the server registered in advance on the memory 104 to give information of the new application software having been installed on the portable terminal 2 (for example, name or version of the new application software). In return, the MFP 1 receives update information of the cooperation table in Step S105.

It is then in Step S106 whether or not to receive a new cooperation table from the server. Receiving it from the server (YES in Step S106), in Step S108, the MFP 1 transfers it to the portable terminal 2 along with a request to update the cooperation table with the new one. Then the routine proceeds to Step S109. Meanwhile, when the MFP 1 has a cooperation table, the MFP 1 updates its cooperation table with the new one. If the MFP 1 does not receive a new cooperation table from the server (NO in Step S106), in Step S107, the portable terminal 2 again turns ON the flag representing cooperation table update while the cooperation with the MFP 1 is active. Then the routine proceeds to Step S109.

Subsequently, the MFP 1 receives from the portable terminal 2, screen data for reproducing an operation screen of the portable terminal 2 in Step S109, and displays the operation screens of the MFP 1 itself and the portable terminal 2 together side by side on the display portion 105b in Step S110.

It is then judged in Step S111 whether or not the user has just operated the operation screen of the portable terminal 2. If the user has not operated yet (NO in Step S111), the routine proceeds to Step S115. If the user has just operated (YES in Step S111), the routine proceeds to Step S112, in which: the MFP 1 transmits to the portable terminal 2, operation information about the operation screen of the portable terminal 2; receives from the portable terminal 2, screen update information (i.e., screen data for reproducing a next operation screen of the portable terminal 2); and displays the next operation screen of the portable terminal 2 on the display portion 105b.

Subsequently, the MFP 1 further receives a potential next operation that corresponds to the user's operation in Step S113. It is then judged in Step S114 whether or not there is a suitable operation screen for the potential next operation. If there is such a suitable operation screen (YES in Step S114), the routine proceeds to Step S115, in which the MFP 1 updates the operation screen of itself with the suitable operation screen. Then the routine proceeds to Step S116. If there is no such suitable operation screen (NO in Step S114), the routine proceeds to Step S116.

In Step S116, it is judged whether or not it is necessary to update the operation screen of the portable terminal 2 on the display portion 105b. If it is necessary (YES in Step S116), the routine proceeds to Step S117, in which the MFP 1 transmits to the portable terminal 2, a request for screen data for reproducing a next operation screen of the portable terminal 2; receives the screen data therefrom; and updates the operation screen of itself with the next operation screen. Then the routine proceeds to Step S118. If it is not necessary (NO in Step S116), the routine proceeds to Step S118.

In Step S118, it is judged whether or not the user gives instructions for switching the operation screen of the MFP 1. The user may give such instructions by pressing a call button for switching the first candidate screen to the other or one of the other candidate screens or pressing a "Previous Screen" button, for example.

If the user gives such instructions (YES in Step S118), the MFP 1 switches the operation screen of itself to the next operation screen in Step S119. Then the routine proceeds to Step S120. If the user does not give such instructions (NO in Step S118), the routine proceeds to Step S120.

In Step S120, it is judged whether or not to receive instructions for terminating the cooperation mode. If there are no such instructions (NO in Step S120), the routine returns to Step S111. If there are such instructions (YES in Step S120), the routine proceeds to Step S121, in which the cooperation mode is turned OFF, i.e.; the MFP 1 displays an ordinary operation screen of the MFP 1 on the display portion 105b. Then the routine terminates.

As described above, in this embodiment, when a new function is added on the portable terminal 2 or an existing function of the portable terminal 2 is enhanced, a server registered in advance on the MFP 1 or the portable terminal 2 is accessed to examine whether or not there is a new cooperation table also applicable for the new or enhanced function; and if there is, a present cooperation table is automatically updated with the new one. Therefore users do not have to manually update a cooperation table every time a new function is added or an existing function is enhanced.

The present invention, whose more than one embodiment has been described in detail herein, can solve the unsolved problems by its following modes.

[1] A cooperative image processing system comprising an image processing apparatus and a portable terminal apparatus capable of connecting to each other, the image processing apparatus comprising:

a display portion;

a screen data obtaining portion that obtains screen data for reproducing a first operation screen that allows operating the portable terminal apparatus, from the portable terminal apparatus;

a display controller that displays a second operation screen that allows operating the image processing apparatus and the first operation screen based on the screen data obtained by the screen data obtaining portion, together on the display portion; and a transmitter that transmits to the portable terminal apparatus: screen data for reproducing a next second operation screen when the next second operation screen needs to be displayed on the display portion instead of the second operation screen; and operation information when user operates the first operation screen on the display portion, the portable terminal apparatus comprising:
a display portion;
a screen data obtaining portion that obtains screen data for reproducing the second operation screen, from the image processing apparatus;
a display controller that displays the first operation screen and the second operation screen based on the screen data obtained by the screen data obtaining portion of the portable terminal apparatus, together on the display portion of the portable terminal apparatus;
a transmitter that transmits to the image processing apparatus: screen data for reproducing a next first operation screen when the next first operation screen needs to be displayed on the display portion of the portable terminal apparatus instead of the first operation screen; and operation information when user operates the second operation screen thereon;
a memory that stores a cooperation table that contains the detail of operations on the first operation screen and potential next operations most likely expected to follow the operations;
an operation identification portion that, when user operates the first operation screen on the display portion of the portable terminal apparatus or the image processing apparatus, identifies a potential next operation as corresponding to the user's operation among those in the cooperation table; and
a notification transmitter that transmits a notification of the potential next operation identified by the operation identification portion,
wherein the image processing apparatus further comprises a switch portion that switches the second operation screen on the display portion of the image processing apparatus, to a suitable operation screen for the potential next operation when the image processing apparatus receives the notification from the portable terminal apparatus.

[2] A cooperative image processing system comprising an image processing apparatus and a portable terminal apparatus capable of connecting to each other,
the image processing apparatus comprising:
a display portion;
a screen data obtaining portion that obtains screen data for reproducing a first operation screen that allows operating the portable terminal apparatus, from the portable terminal apparatus;
a display controller that displays a second operation screen that allows operating the image processing apparatus and the first operation screen based on the screen data obtained by the screen data obtaining portion, together on the display portion;
a transmitter that transmits to the portable terminal apparatus: screen data for reproducing a next second operation screen when the next second operation screen needs to be displayed on the display portion instead of the second operation screen; and operation information indicating when user operates the first operation screen on the display portion; and
a memory that stores a cooperation table that contains the detail of operations on the first operation screen and potential next operations most likely expected to follow the operations,
the portable terminal apparatus comprising:
a display portion;
a screen data obtaining portion that obtains screen data for reproducing the second operation screen, from the image processing apparatus;
a display controller that displays a first operation screen that allows operating the portable terminal apparatus and the second operation screen based on the screen data obtained from the image processing apparatus, together on the display portion;
a transmitter that transmits to the image processing apparatus: screen data for reproducing a next first operation screen when the next first operation screen needs to be displayed on the display portion of the portable terminal instead of the first operation screen; and operation information when user operates the second operation screen thereon; and
a notification transmitter that, when user operates the first operation screen on the display portion of the portable terminal apparatus or the image processing apparatus, transmits a notification of the user's operation to the image processing apparatus, wherein the image processing apparatus further comprises:
an operation identification portion that, when the image processing apparatus receives the notification from the portable terminal apparatus, identifies a potential next operation as corresponding to the user's operation among those in the cooperation table; and
a switch portion that switches the second operation screen on the display portion of the image processing apparatus, to a suitable operation screen for the potential next operation identified by the operation identification portion.

[3] The cooperative image processing system as recited in the aforementioned item [1] or [2], wherein if there is more than one suitable operation screen for more than one potential next operation or only one potential next operation identified, the switch portion of the image processing apparatus switches the second operation screen to one of the more than one suitable operation screen while displaying call buttons for calling the other suitable operation screens onto the display portion of the image processing apparatus in place of the present suitable operation screen.

[4] The cooperative image processing system as recited in any one of the aforementioned items [1] to [3], wherein the switch portion of the image processing apparatus selects the suitable operation screen on the basis of information of the user who has just operated the first operation screen.

[5] The cooperative image processing system as recited in any one of the aforementioned items [1], [3], and [4], wherein the portable terminal apparatus further comprises:
a detector that detects whether or not a new function is installed on the portable terminal apparatus or an existing function of the portable terminal apparatus is enhanced;
an examination portion that, if the detector detects that a new function is installed thereon or an existing function thereof is enhanced, examines whether or not the image processing apparatus or a server registered in advance has a new cooperation table also applicable for the new or enhanced function, by communicating with the image processing apparatus or the server; and
an update portion that, if the image processing apparatus or a server registered in advance has a new cooperation table also applicable for the new or enhanced function as the result of examination, obtains the new cooperation table therefrom to update the present cooperation table with the new one.

[6] The cooperative image processing system as recited in any one of the aforementioned items [1], [3], and [4], wherein the image processing apparatus further comprises:

a detector that detects whether or not a new function is installed on the portable terminal apparatus or an existing function of the portable terminal apparatus is enhanced;

an examination portion that, if the detector detects that a new function is installed thereon or an existing function thereof is enhanced, examines whether or not a server registered in advance has a new cooperation table also applicable for the new or enhanced function, by communicating with the server; and an update portion that, if a server registered in advance has a new cooperation table also applicable for the new or enhanced function as the result of examination, makes the portable terminal apparatus obtain the new cooperation table therefrom to update the present cooperation table of the portable terminal apparatus with the new one.

[7] The cooperative image processing system as recited in any one of the aforementioned items [2] to [4], wherein the image processing apparatus further comprises:

a detector that detects whether or not a new function is installed on the portable terminal apparatus or an existing function of the portable terminal apparatus is enhanced;

an examination portion that, if the detector detects that a new function is installed thereon or an existing function thereof is enhanced, examines whether or not a server registered in advance has a new cooperation table also applicable for the new or enhanced function, by communicating with the server; and an update portion that, if a server registered in advance has a new cooperation table also applicable for the new or enhanced function as the result of examination, obtains the new cooperation table therefrom to update the present cooperation table with the new one.

[8] A cooperative image processing method to be implemented by a cooperative image processing system comprising an image processing apparatus and a portable terminal apparatus capable of connecting to each other, the cooperative image processing method comprising:

the following steps of the image processing apparatus:

obtaining screen data for reproducing a first operation screen that allows operating the portable terminal apparatus, from the portable terminal apparatus;

displaying a second operation screen that allows operating the image processing apparatus and the first operation screen based on the screen data obtained from the portable terminal apparatus, together on a display portion; and transmitting to the portable terminal apparatus: screen data for reproducing a next second operation screen when the next second operation screen needs to be displayed on the display portion instead of the second operation screen; and operation information when user operates the first operation screen on the display portion; and the following steps of the portable terminal apparatus:

obtaining screen data for reproducing the second operation screen from the image processing apparatus;

displaying the first operation screen and the second operation screen based on the screen data obtained from the image processing apparatus, together on a display portion;

transmitting to the image processing apparatus: screen data for reproducing a next first operation screen when the next first operation screen needs to be displayed on the display portion of the portable terminal apparatus instead of the first operation screen; and operation information when user operates the second operation screen thereon; and storing on a memory, a cooperation table that contains the detail of operations on the first operation screen and potential next operations most likely expected to follow the operations;

when user operates the first operation screen on the display portion of the portable terminal apparatus or the image processing apparatus, identifying a potential next operation as corresponding to the user's operation among those in the cooperation table; and transmitting a notification of the identified potential next operation to the image processing apparatus, wherein the cooperative image processing method further comprises the following step of the image processing apparatus: switching the second operation screen on the display portion of the image processing apparatus to a suitable operation screen for the potential next operation, when the image processing apparatus receives a notification of the potential next operation.

[9] A cooperative image processing method to be implemented by a cooperative image processing system comprising an image processing apparatus and a portable terminal apparatus capable of connecting to each other, the cooperative image processing method comprising:

the following steps of the image processing apparatus:

obtaining screen data for reproducing a first operation screen that allows operating the portable terminal apparatus, from the portable terminal apparatus;

displaying a second operation screen that allows operating the image processing apparatus and the first operation screen based on the screen data obtained from the portable terminal apparatus, together on a display portion;

transmitting to the portable terminal apparatus: screen data for reproducing a next second operation screen when the next second operation screen needs to be displayed on the display portion instead of the second operation screen; and operation information when user operates the first operation screen on the display portion; and storing on a memory, a cooperation table that contains the detail of operations on the first operation screen and potential next operations most likely expected to follow the operations; and the following steps of the portable terminal apparatus:

obtaining screen data for reproducing the second operation screen from the image processing apparatus;

displaying the first operation screen and the second operation screen based on the screen data obtained from the image processing apparatus, together on a display portion;

transmitting to the image processing apparatus: screen data for reproducing a next first operation screen when the next first operation screen needs to be displayed on the display portion of the portable terminal apparatus instead of the first operation screen; and operation information when user operates the second operation screen thereon; and when user operates the first operation screen on the display portion of the portable terminal apparatus or the image processing apparatus, transmitting a notification of the user's operation to the image processing apparatus, wherein the cooperative image processing method further comprises the following step of the image processing apparatus:

when the image processing apparatus receives the notification of the user's operation from the portable terminal apparatus, identifying a potential next operation as corresponding to the user's operation among those in the cooperation table; and switching the second operation screen on the display portion of the image processing apparatus, to a suitable operation screen for the identified potential next operation.

[10] A portable terminal apparatus comprising:
a connector that connects to an image processing apparatus;
a display portion;
a screen data obtaining portion that obtains screen data for reproducing a second operation screen that allows operating the image processing apparatus, from the image processing apparatus;
a display controller that displays a first operation screen that allows operating the portable terminal apparatus and the second operation screen based on the screen data obtained from the image processing apparatus, together on the display portion;
a transmitter that transmits to the image processing apparatus: screen data for reproducing a next first operation screen when the next first operation screen needs to be displayed on the display portion instead of the first operation screen; and operation information when user operates the second operation screen thereon;
a memory that stores a cooperation table that contains the detail of operations on the first operation screen and potential next operations most likely expected to follow the operations;
an operation identification portion that, when user operates the first operation screen on the display portion of the portable terminal apparatus or the image processing apparatus, identifies a potential next operation as corresponding to the user's operation among those in the cooperation table; and
a notification transmitter that transmits a notification of the potential next operation identified by the operation identification portion.

[11] An image processing apparatus comprising:
a connector that connects to a portable terminal apparatus;
a display portion;
a screen data obtaining portion that obtains screen data for reproducing a first operation screen that allows operating the portable terminal apparatus, from the portable terminal apparatus;
a display controller that displays a second operation screen that allows operating the image processing apparatus and the first operation screen based on the screen data obtained by the screen data obtaining portion, together on the display portion;
a transmitter that transmits to the portable terminal apparatus, operation information when user operates the first operation screen on the display portion; and
a switch portion that switches the second operation screen on the display portion to a suitable operation screen for a potential next operation to be received from the portable terminal apparatus, when user operates the first operation screen on the display portion of the image processing apparatus or on a display portion of the portable terminal apparatus.

[12] An image processing apparatus comprising:
a connector that connects to a portable terminal apparatus;
a display portion;
a screen data obtaining portion that obtains screen data for reproducing a first operation screen that allows operating the portable terminal apparatus, from the portable terminal apparatus;
a display controller that displays a second operation screen that allows operating the image processing apparatus and the first operation screen based on the screen data obtained by the screen data obtaining portion, together on the display portion;
a transmitter that transmits to the portable terminal apparatus, operation information when user operates the first operation screen on the display portion;
a memory that stores a cooperation table that contains the detail of operations on the first operation screen and potential next operations most likely expected to follow the operations;
an operation identification portion that identifies a potential next operation to be received from the portable terminal apparatus, among those in the cooperation table, when user operates the first operation screen on the display portion of the image processing apparatus or on a display portion of the portable terminal apparatus; and
a switch portion that switches the second operation screen on the display portion to a suitable operation screen for the potential next operation identified by the operation identification portion.

[13] The image processing apparatus as recited in the aforementioned item [11] or [12], wherein if there is more than one suitable operation screen for more than one potential next operation or only one potential next operation identified, the switch portion switches the second operation screen to one of the more than one suitable operation screen while displaying call buttons for calling the other suitable operation screens onto the display portion in place of the present suitable operation screen.

[14] The image processing apparatus as recited in any one of the aforementioned items [11] to [13], wherein the switch portion selects the suitable operation screen on the basis of information of the user who has just operated the first operation screen.

[15] The portable terminal apparatus as recited in the aforementioned item [10] further comprises:
a detector that detects whether or not a new function is installed on the portable terminal apparatus or an existing function of the portable terminal apparatus is enhanced;
an examination portion that, if the detector detects that a new function is installed thereon or an existing function thereof is enhanced, examines whether or not a server registered in advance has a new cooperation table also applicable for the new or enhanced function, by communicating with the server; and
an update portion that, if the image processing apparatus or a server registered in advance has a new cooperation table also applicable for the new or enhanced function as the result of examination, obtains the new cooperation table therefrom to update the present cooperation table with the new one.

[16] The image processing apparatus as recited in any one of the aforementioned items [11] and [13] to [15] further comprises:
a detector that detects whether or not a new function is installed on the portable terminal apparatus or an existing function of the portable terminal apparatus is enhanced;
an examination portion that, if the detector detects that a new function is installed thereon or an existing function thereof is enhanced, examines whether or not a server registered in advance has a new cooperation table also applicable for the new or enhanced function, by communicating with the server; and
an update portion that, if a server registered in advance has a new cooperation table also applicable for the new or enhanced function as the result of examination, makes the portable terminal apparatus obtain the new cooperation table therefrom to update the present cooperation table of the portable terminal apparatus with the new one.

[17] The image processing apparatus as recited in any one of the aforementioned items [12] to [15] further comprises:
- a detector that detects whether or not a new function is installed on the portable terminal apparatus or an existing function of the portable terminal apparatus is enhanced;
- an examination portion that, if the detector detects that a new function is installed thereon or an existing function thereof is enhanced, examines whether or not a server registered in advance has a new cooperation table also applicable for the new or enhanced function, by communicating with the server; and
- an update portion that, if the image processing apparatus or a server registered in advance has a new cooperation table also applicable for the new or enhanced function as the result of examination, obtains the new cooperation table therefrom to update the present cooperation table with the new one.

[18] A non-transitory computer-readable recording medium with a cooperation program being stored thereon to make a computer of an image processing apparatus execute:
- connecting to a portable terminal apparatus;
- obtaining screen data for reproducing a first operation screen that allows operating the portable terminal apparatus, from the portable terminal apparatus;
- displaying a second operation screen that allows operating the image processing apparatus and the first operation screen based on the screen data obtained from the portable terminal apparatus, together on a display portion;
- transmitting to the portable terminal apparatus, operation information when user operates the first operation screen on the display portion; and
- switching the second operation screen on the display portion to a suitable operation screen for a potential next operation to be received from the portable terminal apparatus, when user operates the first operation screen on the display portion of the image processing apparatus or on a display portion of the portable terminal apparatus.

[19] A non-transitory computer-readable recording medium with a cooperation program being stored thereon to make a computer of an image processing apparatus execute:
- connecting to a portable terminal apparatus;
- obtaining screen data for reproducing a first operation screen that allows operating the portable terminal apparatus, from the portable terminal apparatus;
- displaying a second operation screen that allows operating the image processing apparatus and the first operation screen based on the screen data obtained from the portable terminal apparatus, together on a display portion;
- transmitting to the portable terminal apparatus, operation information when user operates the first operation screen on the display portion;
- storing on a memory, a cooperation table that contains the detail of operations on the first operation screen and potential next operations expected to follow the operations;
- identifying a potential next operation to be received from the portable terminal apparatus, among those in the cooperation table, when user operates the first operation screen on the display portion of the image processing apparatus or on a display portion of the portable terminal apparatus; and
- switching the second operation screen on the display portion of the image processing apparatus, to a suitable operation screen for the identified potential next operation.

According to the aforementioned mode of the invention [1], the portable terminal apparatus has a cooperation table that contains the detail of operations on operation screens of the portable terminal apparatus itself and potential next operations most likely expected to follow the operations, both of which are stored in advance on its memory. When a user operates an operation screen of the portable terminal apparatus on the display portion of either the image processing apparatus or the portable terminal apparatus, the portable terminal 2 identifies a potential next operation as corresponding to the user's operation by searching the cooperation table, and transmits a notification of the potential next operation to the image processing apparatus. Receiving the potential next operation from the portable terminal apparatus, the image processing apparatus switches an operation screen of itself on its display portion to a suitable operation screen for the potential next operation and returns screen data for reproducing the suitable operation screen to the portable terminal apparatus. On the basis of the screen data, the portable terminal apparatus also switches an operation screen of the image processing apparatus on its display portion to the suitable operation screen.

In other words, only by storing in advance on the portable terminal apparatus, operations on operation screens of the portable terminal apparatus and potential next operations most likely expected to follow the operations, when a user operates an operation screen of the portable terminal apparatus on the display portion of either the image processing apparatus or the portable terminal apparatus, both of the image processing apparatus and the portable terminal apparatus are allowed to switch an operation screen of the image processing apparatus on their respective display portions to a suitable operation screen for the user's operation. Thus users can display a preferred operation screen of the image processing apparatus pretty easily without the need for troublesome manual operation.

According to the aforementioned mode of the invention [2], the image processing apparatus has a cooperation table that that contains the detail of operations on operation screens of the portable terminal apparatus and potential next operations most likely expected to follow the operations, both of which are stored in advance on its memory. When a user operates an operation screen of the portable terminal apparatus on the display portion of either the image processing apparatus or the portable terminal apparatus, the portable terminal 2 transmits a notification of the detail of the user's operation to the image processing apparatus. Receiving the notification from the portable terminal apparatus, the image processing apparatus identifies a potential next operation as corresponding to the user's operation by searching the cooperation table, switches an operation screen of itself on its display portion to a suitable operation screen for the potential next operation, and returns screen data for reproducing the suitable operation screen to the portable terminal apparatus. On the basis of the screen data, the portable terminal apparatus also switches an operation screen of the image processing apparatus on its display portion to the suitable operation screen.

In other words, only by storing in advance on the image processing apparatus, operations on operation screens of the portable terminal apparatus and potential next operations most likely expected to follow the operations, when a user operates an operation screen of the portable terminal apparatus on the display portion of either the image processing apparatus or the portable terminal apparatus, both of the image processing apparatus and the portable terminal apparatus are allowed to switch an operation screen of the image processing apparatus on their respective display portions to a suitable operation screen for the user's operation. Thus users can display a preferred operation screen of the image processing apparatus pretty easily without the need for troublesome manual operation.

According to the aforementioned mode of the invention [3], if there is more than one suitable operation screen for more than one potential next operation or only one potential next operation identified, an operation screen of the image processing apparatus is switched to one of the more than one suitable operation screen while call buttons for calling the other one or more suitable operation screens onto the display portion in place of the present suitable operation screen appear. Thus user can view other operation screens pretty easily with these call buttons.

According to the aforementioned mode of the invention [4], an operation screen preferred by user, a setting screen for example, is selected and displayed on the basis of information of the user who has just operated an operation screen of the portable terminal apparatus.

According to the aforementioned mode of the invention [5], when a new function is installed on the portable terminal apparatus or an existing function of the portable terminal is enhanced, it is judged whether or not either of the image processing apparatus or a server registered in advance has a new cooperation table also applicable for the new or enhanced function; if either of them has, the new cooperation table is obtained therefrom by the portable terminal apparatus and the existing cooperation table of the portable terminal apparatus is automatically updated with the new one. Thus user does not have to update the cooperation table manually every time there is a new or enhanced function.

According to the aforementioned mode of the invention [6], when a new function is installed on the portable terminal apparatus or an existing function of the portable terminal apparatus is enhanced, a new cooperation table also applicable for the new or enhanced function is obtained by the image processing apparatus and the existing cooperation table of the portable terminal apparatus is automatically updated with the new one. Thus user does not have to update the cooperation table manually every time there is a new or enhanced function.

According to the aforementioned mode of the invention [7] when a new function is installed on the portable terminal apparatus or an existing function of the portable terminal apparatus is enhanced, a new cooperation table also applicable for the new or enhanced function is obtained by the image processing apparatus and the existing cooperation table of the image forming apparatus is automatically updated with the new one. Thus user does not have to update the cooperation table manually every time there is a new or enhanced function.

According to the aforementioned mode of the invention [8], user can display a preferred operation screen of the image processing apparatus pretty easily without the need for troublesome manual operation.

According to the aforementioned mode of the invention [9], user can display a preferred operation screen of the image processing apparatus pretty easily without the need for troublesome manual operation.

According to the aforementioned mode of the invention [10], the portable terminal apparatus is allowed to display user's preferred operation screen of the image processing apparatus on its display portion pretty easily without requiring user to perform troublesome manual operations.

According to the aforementioned mode of the invention [11], the image processing apparatus is allowed to display user's preferred operation screen of the image processing apparatus on its display portion pretty easily without requiring user to perform troublesome manual operations.

According to the aforementioned mode of the invention [12], the image processing apparatus is allowed to display user's preferred operation screen of the image processing apparatus on its display portion pretty easily without requiring user to perform troublesome manual operations.

According to the aforementioned mode of the invention [13], if there is more than one potential next operation identified, the image processing apparatus is allowed to switch the second operation screen to a suitable operation screen for one of the more than one potential next operation while displaying call buttons for calling other suitable operation screens for the other one or more potential next operations onto the display portion in place of the present suitable operation screen. Thus user can view other operation screens pretty easily with these call buttons.

According to the aforementioned mode of the invention [14], the image processing apparatus is allowed to select and display an operation screen preferred by user, a setting screen for example, on the basis of information of the user who has just operated an operation screen of the portable terminal apparatus.

According to the aforementioned mode of the invention [15], when detecting that a new function is installed on the portable terminal apparatus or an existing function of the portable terminal is enhanced, the portable terminal apparatus is allowed to examine if either of the image processing apparatus or a server registered in advance has a new cooperation table also applicable for the new or enhanced function; if either of them has, the portable terminal apparatus is allowed to obtain the new cooperation table therefrom to have its existing cooperation table updated with the new one automatically. Thus user does not have to update the cooperation table manually every time there is a new or enhanced function.

According to the aforementioned mode of the invention [16], when a new function is installed on the portable terminal apparatus or an existing function of the portable terminal apparatus is enhanced, the image processing apparatus is allowed to obtain a new cooperation table also applicable for the new or enhanced function to have the existing cooperation table of the portable terminal apparatus updated with the new one automatically. Thus user does not have to update the cooperation table manually every time there is a new or enhanced function.

According to the aforementioned mode of the invention [17], when a new function is installed on the portable terminal apparatus or an existing function of the portable terminal apparatus is enhanced, the image processing apparatus is allowed to obtain a new cooperation table also applicable for the new or enhanced function to have its existing cooperation table updated with the new one automatically. Thus user does not have to update the cooperation table manually every time there is a new or enhanced function.

According to the aforementioned mode of the invention [18] or [19], a computer of the image processing apparatus is allowed to display user's preferred operation screen of the image processing apparatus on the display portion of the image processing apparatus without requiring user to perform troublesome manual operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A cooperative image processing system comprising an image processing apparatus and a portable terminal apparatus capable of connecting to each other, the image processing apparatus comprising:
a first display portion;
a first processor executes instructions to control the functions of:
a first screen data obtaining portion that obtains screen data for reproducing a first operation screen that allows operating the portable terminal apparatus, from the portable terminal apparatus;
a first display controller that displays a second operation screen that allows operating the image processing apparatus and displays the first operation screen based on the screen data obtained by the first screen data obtaining portion, together on the first display portion; and
a transmitter that transmits to the portable terminal apparatus operation information when the first operation screen is operated on the first display portion,
the portable terminal apparatus comprising:
a second display portion;
a second processor executes instructions to control the functions of:
a second screen data obtaining portion that obtains screen data for reproducing the second operation screen, from the image processing apparatus;
a second display controller that displays the first operation screen and displays the second operation screen based on the screen data obtained by the second screen data obtaining portion of the portable terminal apparatus, together on the second display portion;
a transmitter that transmits to the image processing apparatus operation information when the second operation screen is operated on the second display portion;
a memory that stores a cooperation table that contains a list of operations that can be performed on the first operation screen and a plurality of next second operations to be displayed in a next second operation screen that allows operating the image processing apparatus, each of the next second operations corresponding to a respective one of the operations on the list of operations that can be performed on the first operation screen;
the second processor executes instructions to further control the functions of:
an operation identification portion that, when an operation is operated on the first operation screen on the first display portion or on the second display portion, identifies one of the next second operations as corresponding to the operation among those in the cooperation table; and
a notification transmitter that transmits a notification of the one next second operation identified by the operation identification portion,
wherein the image processing apparatus further comprises a switch portion, controlled by the instructions executed by the first processor, that displays the next second operation screen corresponding to the one next second operation on the first display portion when the image processing apparatus receives the notification from the portable terminal apparatus.

2. The cooperative image processing system as recited in claim 1, wherein when there is more than one suitable second operation screen for more than one next second operation or only one next second operation identified, the switch portion of the image processing apparatus displays the second operation screen to one of the more than one suitable second operation screens while displaying call buttons for calling the other suitable second operation screens onto the first display portion of the image processing apparatus in place of the present suitable second operation screen.

3. The cooperative image processing system as recited in claim 1, wherein the switch portion of the image processing apparatus selects the suitable second operation screen on the basis of information of a user who has just operated the first operation screen.

4. The cooperative image processing system as recited in claim 1, wherein the portable terminal apparatus further comprises:
the second processor executes instructions to further control the functions of:

a detector that detects whether or not a new function is installed on the portable terminal apparatus or an existing function of the portable terminal apparatus is enhanced;

an examination portion that, if the detector detects that a new function is installed thereon or an existing function thereof is enhanced, examines whether or not the image processing apparatus or a server registered in advance has a new cooperation table also applicable for the new or enhanced function, by communicating with the image processing apparatus or the server; and an update portion that, if the image processing apparatus or a server registered in advance has a new cooperation table also applicable for the new or enhanced function as the result of examination, obtains the new cooperation table therefrom to update the present cooperation table with the new cooperation table.

5. The cooperative image processing system as recited in claim 1, wherein the image processing apparatus further comprises:

the second processor executes instructions to further control the functions of:

a detector that detects whether or not a new function is installed on the portable terminal apparatus or an existing function of the portable terminal apparatus is enhanced;

an examination portion that, if the detector detects that a new function is installed thereon or an existing function thereof is enhanced, examines whether or not a server registered in advance has a new cooperation table also applicable for the new or enhanced function, by communicating with the server; and an update portion that, if a server registered in advance has a new cooperation table also applicable for the new or enhanced function as the result of examination, makes the portable terminal apparatus obtain the new cooperation table therefrom to update the present cooperation table of the portable terminal apparatus with the new cooperation table.

6. A cooperative image processing method to be implemented by a cooperative image processing system comprising an image processing apparatus and a portable terminal apparatus capable of connecting to each other, the cooperative image processing method comprising:

the following steps of the image processing apparatus:

obtaining screen data for reproducing a first operation screen that allows operating the portable terminal apparatus, from the portable terminal apparatus;

displaying a second operation screen that allows operating the image processing apparatus and displaying the first operation screen based on the screen data obtained from the portable terminal apparatus, together on a first display portion; and transmitting to the portable terminal apparatus operation information when the first operation screen is operated on the first display portion; and the following steps of the portable terminal apparatus:

obtaining screen data for reproducing the second operation screen from the image processing apparatus;

displaying the first operation screen and displaying the second operation screen based on the screen data obtained from the image processing apparatus, together on a second display portion;

transmitting to the image processing apparatus operation information when the second operation screen is operated on the second display portion; and storing on a memory, a cooperation table that contains a list of operations that can be performed on the first operation screen and a plurality of next second operations to be displayed in a next second operation screen that allows operating the image processing apparatus, each of the next second operations corresponding to a respective one of the operations on the list of operations that can be performed on the first operation screen;

when an operation is operated on the first operation screen on the first display portion or on the second display portion, identifying one of the next second operations as corresponding to the operation among those in the cooperation table; and transmitting a notification of the identified next second operation to the image processing apparatus, wherein the cooperative image processing method further comprises the following step of the image processing apparatus: displaying the next second operation screen corresponding to the one next second operation on the first display portion when the image processing apparatus receives the notification.

7. A portable terminal apparatus comprising:

a connector that connects to an image processing apparatus;

a second display portion;

a second processor executes instructions to control the functions of:

a second screen data obtaining portion that obtains screen data for reproducing a second operation screen that allows operating the image processing apparatus, from the image processing apparatus;

a display controller that displays a first operation screen that allows operating the portable terminal apparatus and displaying the second operation screen based on the screen data obtained from the image processing apparatus, together on the second display portion;

a transmitter that transmits to the image processing apparatus operation information when the second operation screen is operated on the second display portion;

a memory that stores a cooperation table that contains a list of operations that can be performed on the first operation screen and a plurality of next second operations to be displayed in a next second operation screen that allows operating the image processing apparatus, each of the next second operations corresponding to a respective one of the operations on the list of operations that can be performed on the first operation screen;

the second processor executes instructions to further control the functions of:

an operation identification portion that, when an operation is operated on the first operation screen on the first display portion or on the second display portion, identifies one of the next second operations as corresponding to the operation among those in the cooperation table; and a notification transmitter that transmits a notification of the one next second operation identified by the operation identification portion.

8. An image processing apparatus comprising:

a connector that connects to a portable terminal apparatus;

a first display portion;

a first processor executes instructions to control the functions of:

a first screen data obtaining portion that obtains screen data for reproducing a first operation screen that allows operating the portable terminal apparatus, from the portable terminal apparatus;

a display controller that displays a second operation screen that allows operating the image processing apparatus and displays the first operation screen based on the screen data obtained by the first screen data obtaining portion, together on the first display portion;

a transmitter that transmits to the portable terminal apparatus, operation information when the first operation screen is operated on the first display portion; and a switch portion that changes the second operation screen on the first display portion to a suitable operation screen for a next second operation, wherein the suitable operation screen is received from the portable terminal apparatus when an operation is performed on the first operation screen on the first display portion or on a second display portion of the portable terminal apparatus, wherein the suitable operation screen is selected from a memory in the portable terminal apparatus that contains a list of operations that can be performed on the first operation screen and a plurality of next second operations to be displayed in the suitable operation screen that allows operating the image processing apparatus, each of the next second operations corresponding to a respective one of the operations on the list of operations that can be performed on the first operation screen.

9. The image processing apparatus as recited in claim 8, wherein when there is more than one suitable second operation screen for more than one next second operation or only one next second operation identified, the switch portion displays the second operation screen to one of the more than one suitable second operation screens while displaying call buttons for calling the other suitable second operation screens onto the first display portion in place of the present suitable second operation screen.

10. The image processing apparatus as recited in claim 8, wherein the specify portion selects the suitable second operation screen on the basis of information of a user who has just operated the first operation screen.

11. The portable terminal apparatus as recited in claim 7 further comprises:

the second processor executes instructions to further control the functions of:

a detector that detects whether or not a new function is installed on the portable terminal apparatus or an existing function of the portable terminal apparatus is enhanced;

an examination portion that, if the detector detects that a new function is installed thereon or an existing function thereof is enhanced, examines whether or not a server registered in advance has a new cooperation table also applicable for the new or enhanced function, by communicating with the server; and an update portion that, if the image processing apparatus or a server registered in advance has a new cooperation table also applicable for the new or enhanced function as the result of examination, obtains the new cooperation table therefrom to update the present cooperation table with the new cooperation table.

12. The image processing apparatus as recited in claim 8 further comprises:

the first processor executes instructions to further control the functions of:

a detector that detects whether or not a new function is installed on the portable terminal apparatus or an existing function of the portable terminal apparatus is enhanced;

an examination portion that, if the detector detects that a new function is installed thereon or an existing function thereof is enhanced, examines whether or not a server registered in advance has a new cooperation table also applicable for the new or enhanced function, by communicating with the server; and an update portion that, if a server registered in advance has a new cooperation table also applicable for the new or enhanced function as the result of examination, makes the portable terminal apparatus obtain the new cooperation table therefrom to update the present cooperation table of the portable terminal apparatus with the new cooperation table.

13. A non-transitory computer-readable recording medium with a cooperation program being stored thereon to make a computer of an image processing apparatus execute:

connecting to a portable terminal apparatus;

obtaining screen data for reproducing a first operation screen that allows operating the portable terminal apparatus, from the portable terminal apparatus;

displaying a second operation screen that allows operating the image processing apparatus and displaying the first operation screen based on the screen data obtained from the portable terminal apparatus, together on a first display portion;

transmitting to the portable terminal apparatus, operation information when an operation is operated on the first operation screen on the first display portion; and changing the second operation screen on the first display portion to a suitable operation screen for a next second operation, wherein the suitable operation screen is received from the portable terminal apparatus when a user operates the first operation screen on the first display portion of the image processing apparatus or on a second display portion of the portable terminal apparatus, wherein the suitable operation screen is selected from a memory in the portable terminal apparatus that contains a list of operations that can be performed on the first operation screen and a plurality of next second operations to be displayed in the suitable operation screen that allows operating the image processing apparatus, each of the next second operations corresponding to a respective one of the operations on the list of operations that can be performed on the first operation screen.

14. The cooperative image processing system as recited in claim 1, wherein the next second operation screen is registered on the cooperation table, the next second operation screen to be displayed on the first display portion next to the second operation screen, the next second operation screen corresponding to the one next second operation, the one next second operation being identified as corresponding to an operation among those in the cooperation table.

15. The cooperative image processing method as recited in claim 6, wherein the next second operation screen is registered on the cooperation table, the next second operation screen to be displayed on the first display portion next to the second operation screen, the next second operation screen corresponding to the one next second operation, the one next second operation being identified as corresponding to an operation among those in the cooperation table.

16. The portable terminal apparatus as recited in claim 7, wherein the next second operation screen is registered on the cooperation table, the next second operation screen to be displayed on the first display portion next to the second operation screen, the next second operation screen corresponding to the one next second operation, the one next second operation being identified as corresponding to an operation among those in the cooperation table.

\* \* \* \* \*